US012518283B2

United States Patent
Mor, Jr. et al.

(10) Patent No.: US 12,518,283 B2
(45) Date of Patent: Jan. 6, 2026

(54) SYSTEMS AND METHODS FOR ENHANCED TRANSACTION AUTHENTICATION

(71) Applicant: Stripe, Inc., South San Francisco, CA (US)

(72) Inventors: Sahar Mor, Jr., San Francisco, CA (US); Abhishek Kulgod, San Francisco, CA (US); Ryan Drapeau, Seattle, WA (US)

(73) Assignee: Stripe, Inc., South San Francisco, CA (US)

(*) Notice: Subject to any disclaimer, the term of this patent is extended or adjusted under 35 U.S.C. 154(b) by 122 days.

(21) Appl. No.: 17/959,198

(22) Filed: Oct. 3, 2022

(65) Prior Publication Data

US 2024/0112192 A1 Apr. 4, 2024

(51) Int. Cl.
*G06Q 20/40* (2012.01)
*G06Q 20/34* (2012.01)

(52) U.S. Cl.
CPC ......... *G06Q 20/4016* (2013.01); *G06Q 20/34* (2013.01)

(58) Field of Classification Search
CPC .. G06Q 20/4016; G06Q 20/401; H04W 12/06
See application file for complete search history.

(56) References Cited

U.S. PATENT DOCUMENTS

| 10,977,652 | B1* | 4/2021 | Twilley | G06Q 20/4014 |
| 2015/0310434 | A1* | 10/2015 | Cheung | G06Q 20/3224 |
| | | | | 705/44 |
| 2015/0347965 | A1* | 12/2015 | Wardman | G06Q 20/4016 |
| | | | | 705/325 |
| 2019/0392450 | A1* | 12/2019 | Gosset | H04L 63/083 |

(Continued)

OTHER PUBLICATIONS

American Express retreived Oct. 4, 2022. "Amex for Developers", 57 pages. https://developer.americanexpress.com/products/enhanced-authorization-v2/resources#readme.

(Continued)

*Primary Examiner* — Calvin L Hewitt, II
*Assistant Examiner* — Amanulla Abdullaev
(74) *Attorney, Agent, or Firm* — Finnegan, Henderson, Farabow, Garrett & Dunner, LLP

(57) ABSTRACT

A method and apparatus for authenticating a transaction are described. The method may include: receiving, at an authentication device, an electronic transaction request as part of authenticating a card-originated transaction between a merchant and a consumer; determining, based on characteristics of the electronic transaction request, a risk value associated with the electronic transaction request; selecting a first identification value or a second identification value based on a comparison of the risk value to a risk threshold, wherein the first identification value indicates that the risk value exceeds the risk threshold and the second identification value indicates that the risk value does not exceed the risk threshold; generating a communication to transmit to an authorization device, the communication comprising a first data field having the selected first identification value or the selected second identification value; and transmitting the communication to the authorization device.

18 Claims, 12 Drawing Sheets

(56) References Cited

U.S. PATENT DOCUMENTS

2020/0236105 A1\* 7/2020 Doshi .................. H04W 12/084
2022/0215392 A1\* 7/2022 Wied ....................... G06F 9/547

OTHER PUBLICATIONS

DEVEXCHANGE; retreived Oct. 4, 2022. "Enhanced Decisioning Data", 22 pages. https://developer.capitalone.com/documentation/enhanced-decisioning-data.
Wikipedia, retreived Oct. 4, 2022. "ISO 8583" website, 28 pages. https://en.wikipedia.org/wiki/ISO_8583.

\* cited by examiner

SYSTEMS AND METHODS FOR ENHANCED TRANSACTION AUTHENTICATION

FIELD

Embodiments of the present disclosure relate to the field of transaction authentication and, more particularly, to the field of transaction authentication utilizing risk analysis and reporting.

BACKGROUND

Merchants, such as grocers, car services, dry cleaning services, online marketplaces, etc., provide their products and services to consumers. Such merchants may employ agents to deliver their products and/or provide the actual services to the merchant's customers. For example, a person acting on the merchant's behalf may drive a consumer in their own car, deliver food ordered through a merchant website, pick up and/or drop off clothes dry cleaned by the merchant, etc.

These merchants, although providing systems for supplying products and/or services to consumers, often do not perform the financial processing associated with the merchant transactions. Instead, merchants may utilize commerce systems to process financial transactions for the products and/or services provided to consumers. This may include the merchant, agent, and other users establishing accounts with the commerce system. Once the accounts are established, merchants can run financial transactions using the services of the commerce system, merchant agents can accept payments from customers on behalf of the merchant for provided products and/or services, and the commerce system can process the payments, performs payouts for services rendered, as well as other financial processing services. This processing of payments by the commerce platform may include running credit cards, crediting a merchant account for the transaction, crediting the agent responsible for the transaction, debiting a commerce system fee for processing the transaction on behalf of the merchant, interacting with authorization systems (e.g., bank systems, credit card issuing systems, etc.), as well as performing other commerce related transactions for the merchant and/or agent such as providing payouts for products/services rendered on behalf of a merchant.

To prevent fraudulent transactions, such as when a proffered payment is made with a stolen card number, a card number from an expired card, a spoofed card, etc., the commerce system may perform fraud detection for the transactions. Such fraud detection can include attempting to determine, based on parameters associated with a transaction, whether there is a likelihood that the transaction is fraudulent. For example, whether a card number is associated with past fraudulent transactions, whether the transaction amount or purchase location is atypical for the card number, what IP address a remote transaction has originated from, etc. Thus, the fraud detection seeks to determine when one or more factors associated with the transaction indicate fraud, such as by employing machine learning techniques to analyze transaction data.

After determining that fraud is not involved in the transaction, the commerce system may forward the transaction for authorization to an authorization system, which may be provided, for example, by an issuer of the card involved in the transaction. The authorization system may be communicatively coupled to a card network such as VISA™ or MASTERCARD™, which may facilitate the transaction. However, there may be information asymmetry between the commerce system and the authorization system. For example, the commerce system may contain data related to the transaction that is not available to the authorization system. In some cases, this lack of information may result in the authorization system reaching an incorrect result with respect to the transaction. For example, the authorization system may authorize a transaction that it would otherwise reject or may reject a transaction that it would otherwise accept.

BRIEF DESCRIPTION OF THE DRAWINGS

The present disclosure will be understood more fully from the detailed description given below and from the accompanying drawings of various embodiments, which, however, should not be taken to limit the embodiments described and illustrated herein, but are for explanation and understanding only.

DETAILED DESCRIPTION

Figure 1:
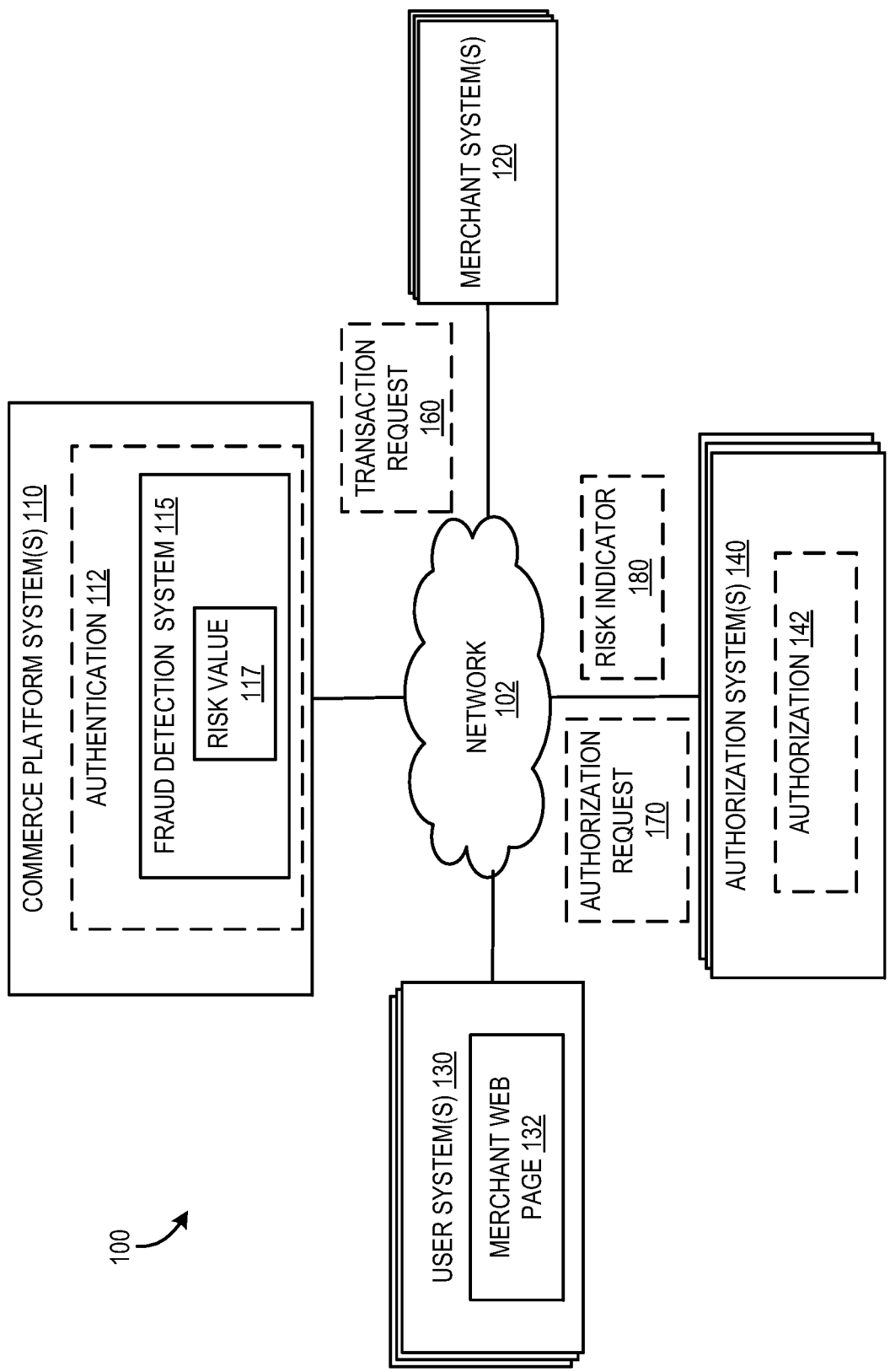
FIG. 1 is a block diagram of an example system architecture for transaction authorization, in accordance with some embodiments of the present disclosure.

In the following description, numerous details are set forth. It will be apparent, however, to one of ordinary skill in the art having the benefit of this disclosure, that the embodiments described herein may be practiced without these specific details. In some instances, well-known structures and devices are shown in block diagram form, rather than in detail, in order to avoid obscuring the embodiments described herein.

Some portions of the detailed description that follow are presented in terms of algorithms and symbolic representations of operations on data bits within a computer memory. These algorithmic descriptions and representations are the means used by those skilled in the data processing arts to effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "receiving", "calculating", "selecting", "generating", "transmitting", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission, or display devices.

The embodiments discussed herein may also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the embodiments discussed herein are not described with reference to any particular programming language. It will be appreciated that a variety of programming languages may be used to implement the teachings as described herein.

In some environments, an in-person or networked computerized financial transaction request between a user computing system and a merchant computing system may further include an authentication computing system and an authorization computing system. In some environments, the authentication computing system and the authorization computing system may be different systems and/or may be run by different entities (e.g., different companies).

The authentication computing system (also referred to herein as a commerce platform) may attempt to validate an identity of the user making the transaction request. This may involve a two-step authentication method such as a One Time Password (OTP) over a text message (e.g., a short message service (SMS) message), a confirmation via an application executing on a mobile device of the user, or other authentication technique known to those of ordinary skill in the art. For example, in some embodiments, the user may be attempting to use a credit card of an issuer (e.g., a bank or other financial entity), and the authentication may be performed utilizing an application provided by the issuer, such as a bank's mobile application.

The authorization computing system (also referred to herein as an authorization system and/or authorization server) may be accessed after the user has been authenticated. For authorization, the transaction request may be sent through a network infrastructure such as a card network. The card network may transmit the transaction request to the authorization computing system, which may belong to, e.g., a card issuer. The authorization operation may attempt to ensure that the transaction is authorized. Reasons for declining a transaction request include credit-related reasons such as insufficient funds, policy-related reasons such as an expired card, and fraud-related reasons such as an abnormal amount.

In an ideal transaction system, only those transaction requests which are valid will be correctly authorized, while only those transaction requests which are invalid will be refused. However, in reality, it is possible to have both false positive (e.g., where a transaction is authenticated and/or authorized that should not have been) and false negative (e.g., a transaction is refused when it should have been allowed) outcomes. In some cases, incorrect outcomes may be due to information asymmetry between the authorization computing system and the authentication computing system, which may be, as previously noted, operated by and/or located separately from one another. Examples of information that may be available to the authentication computing system but not the authorization computing system includes details on the purchase (e.g., what was purchased), the user's browser information, internet protocol (IP) address, email address, and/or billing address. In some case, many of the legacy protocols that may exist between the authentication computing system and the authorization computing system for the transfer of information (e.g., the ISO 8583 protocol) are limited and are optimized for a time where online commerce, and therefore online fraud, was less common. As a result, the authorization computing system may lack information that would be beneficial to its authorization decision.

Aspects of the present disclosure address the above-noted and other deficiencies by providing embodiments in which additional information indicative of the risk of a pending transaction request may be shared between the authentication computing system and the authorization computing system. In some embodiments, data fields of legacy protocols may be repurposed to transport risk related information, such as a calculated risk score. In some embodiments, different identification values (e.g., merchant identification values) may be utilized to indicate different levels of risk. In some embodiments, enhanced application programming interfaces (APIs) may be used to communicate additional information related to the transaction. Embodiments of the present disclosure may allow for enhanced data sharing between the authentication computing system and the authorization computing system. This may allow for the authorization computing system to have more information with which to make its authorization decision. The additional information may lead to more accurate authorization outcomes which may reduce a level of false positive and/or false negative outcomes of the overall system, improving its accuracy. The improvement in accuracy may result in a technological improvement to the operation of the authentication computing system, in that a throughput of the transaction requests that may be successfully processed by the authentication computing system and/or the authentication computing system may be increased.

The embodiments discussed herein may be utilized by a plurality of different types of systems, such as other commerce platform system(s) including payment processing systems, card authorization systems, banks, and other systems seeking to identify and detect fraud during transactions. Furthermore, any system seeking to identify fraud during an interaction may use and/or extend the techniques discussed herein to transaction authorization. However, to avoid obscuring the embodiments discussed herein, fraud detection utilizing risk identification during commercial transactions is discussed to illustrate and describe the embodiments of the present invention, and is not intended to limit the application of the techniques described herein to other systems in which risk identification in transaction processing could be used.

FIG. 1 is a block diagram of an example system architecture 100 for transaction authorization, in accordance with some embodiments of the present disclosure. In some embodiments, the system 100 includes commerce platform system(s) 110, one or more merchant system(s) 120, one or more user system(s) 130, and one or more authorization system(s) 140. In some embodiments, one or more systems (e.g., system 120 and 130) may be mobile computing devices, such as a smartphone, tablet computer, smartwatch, etc., as well as computer systems, such as a desktop computer system, laptop computer system, server computer systems, etc. The commerce platform system(s) 110, merchant system(s) 120, and authorization system(s) 140 may also be one or more computing devices, such as one or more server computer systems, desktop computer systems, etc.

The commerce platform system(s) 110, merchant system(s) 120, user system(s) 130, and/or authorization system(s) 140 may be coupled to a network 102 and communicate with one another using any of the standard protocols for the exchange of information, including secure communication protocols. In one embodiment, one or more of the commerce platform system(s) 110, merchant system(s) 120, user system(s) 130, and/or authorization system(s) 140 may run on one Local Area Network (LAN) and may be incorporated into the same physical or logical system, or different physical or logical systems. In some embodiments, the commerce platform system(s) 110, merchant system(s) 120, user system(s) 130, and/or authorization system(s) 140 may reside on different LANs, wide area networks, cellular telephone networks, etc. that may be coupled together via the Internet but separated by firewalls, routers, and/or other network devices. In one embodiment, commerce platform system 110 may reside on a single server, or be distributed among different servers, coupled to other devices via a public network (e.g., the Internet) or a private network (e.g., LAN). It should be noted that various other network configurations can be used including, for example, hosted configurations, distributed configurations, centralized configurations, etc.

In one embodiment, commerce platform system 110 provides financial processing services to one or more merchants, such as to merchant system(s) 120 and/or user system(s) 130. For example, commerce platform system(s) 110 may manage merchant accounts held at the commerce platform, run financial transactions from user system(s) 130 performed on behalf of a merchant, clear transactions, performing payouts to merchant and/or merchant agents, manage merchant and/or agent accounts held at the commerce platform system(s) 110, as well as other services typically associated with commerce platforms systems such as, for example, STRIPE'.

For example, the user system(s) 130 may access the merchant system(s) 120, such as by an electronic device over network 102. In some embodiments, the user system(s) 130 may access a merchant web page 132. The merchant web page 132 may offer one or more products and/or services from the merchant system(s) 120. For example, the user system(s) 130 may indicate the beginning of a financial transaction with the merchant system(s) 120, such as the use of a credit card to acquire the products and/or services of the merchant system(s) 120. In response to the transaction from the user system(s) 130, the merchant system(s) 120 may generate a transaction request 160 to the commerce platform system(s) 110. The transaction request 160 may include, for example, information related to the transaction with the user system(s) 130 collected by the merchant system(s) 120 as part of the transaction.

In response to the transaction request 160, commerce platform system(s) 110 may perform an authentication operation 112 on the transaction request 160 to prevent and/or reduce fraudulent transactions. In some embodiments, the authentication operation 112 may incorporate a risk calculation performed on the transaction request 160 by a fraud detection system 115 that is associated with the commerce platform system(s) 110. As will be discussed in greater detail below, the fraud detection system 115 may utilize one or more machine learning models, such as neural network based models, tree based models, support vector machine models, classification based models, regression based models, etc., to analyze attributes associated with a transaction request 160, such as card number used in a transaction, email address used in the transaction, dollar amount of a transaction, IP address of the user system(s) 130 making the transaction request, etc., as well as fraud detection features generated by the commerce platform system(s) 110 for use by the machine learning models when analyzing the transaction associated with the transaction request 160, such as a number of transactions on a card used in the transaction, a typical dollar amount of transactions for the card, whether the card number has been used with the email address in a prior transaction, etc.

As part of the authentication operation 112 of the commerce platform system(s) 110, the fraud detection system 115 may generate a risk value 117. The risk value 117 may indicate a relative risk of the transaction associated with the transaction request 160. For example, the risk value 117 may be a numeric value that may vary with the calculated risk of the transaction associated with the transaction request 160. In some embodiments, a higher risk value 117 may indicate a higher level of calculated risk, but the embodiments of the present disclosure are not limited to this configuration. In some embodiments, the risk value 117 may range from 1 to 100, with a risk value 117 of 100 indicating a highest level of risk.

In some embodiments, the commerce platform system(s) 110 may make an authorization decision based on the calculated risk value 117. For example, the commerce platform system(s) 110 may decide to block, perform intervention, or approve the transaction associated with the transaction request 160. Blocking the transaction, which may be because a calculated risk value 117 of the transaction request 160 was too high, may result a message to the merchant system(s) 120 to decline the transaction. In some cases, the commerce platform system(s) 110 may perform intervention related to the transaction request 160 due to the calculated risk value 117. Performing intervention may include, for example, requesting (or asking the merchant system(s) 120 to request) additional authentication from the user system(s) 130, such as two-factor authentication or other type of activity intended to verify the identity of the user system(s) 130. The results of the intervention (e.g., successful completion of two-factor authentication) may result in additional processing, such as the approval of the transaction request 160. If the transaction request 160 is approved, the transaction request 160 may be considered to be authenticated. Responsive to the authentication, an authorization request 170 may be forwarded to the authorization system(s) 140.

The authorization request 170 may request that the transaction associated with the transaction request 160 be authorized in an authorization operation 142. The authorization system(s) 140 (also referred to herein as authorization server) may, for example, be associated with an issuer of a credit card associated with the transaction request 160. The authorization system(s) 140 may further verify that the amount and/or other details associated with the transaction request 160 are authorized. The result of the authorization operation 142 of the authorization system(s) 140 (e.g., whether the transaction request 160 is or is not authorized) may be returned to the commerce platform system(s) 110, which may provide a result of the transaction request 160 to the merchant system(s) 120. For example, the commerce platform system(s) 110 may indicate that the transaction request 160 is successful if both the authorization operation 142 and authentication operation 112 are successful, and may indicate that the transaction request 160 is unsuccessful if either of the authorization operation 142 or the authentication operation 112 fail.

At least some of the authorization operations 142 of the authorization system(s) 140 may be different from the authentication operations 112 of the commerce platform system(s) 110. As a non-limiting example, for a transaction request 160 from a user "John" for $300 at an online merchant, the authentication operation 112 may validate that the transaction request 160 is correctly associated with a valid user "John" and is not otherwise a fraudulent transaction. The authorization operation 142 may validate that the card utilized by John is a valid card and that the $300 being charged is a valid amount (e.g., doesn't exceed a credit limit associated with the card). Though the authentication operation 112 and authorization operation 142 are discussed separately, it will be understood that the data being utilized, as well as the decisions being made, are not necessarily distinct. For example, in some embodiments, whether or not a transaction request 160 is authorized may also be based on whether there are elements of risk associated with the transaction request 160, which may include elements of whether or not the transaction request 160 is correctly authenticated.

In some embodiments, the commerce platform system(s) 110 may additionally provide a risk indicator 180 to the authorization system(s) 140. As will be discussed in further detail herein, the risk indicator 180 may be included as part of the authorization request 170 in some embodiments. In some embodiments, the risk indicator 180 may be provided separately from the authorization request 170. The risk indicator 180 may be utilized by the authorization system(s) 140 to perform additional processing as part of its authorization operation 142. For example, the authorization system(s) 140 may treat an authorization request 170 with a risk indicator 180 indicating higher risk differently from an authorization request 170 with a risk indicator 180 indicating lower risk. As a non-limiting example, a transaction that may be marginal in terms of authorization may be refused if the risk indicator 180 indicates a high level of risk. In contrast, the transaction that is marginal in terms of authorization may be allowed if the risk indicator 180 indicates a low level of risk.

By sharing the risk indicator 180 with the authorization system(s) 140, the commerce platform system(s) 110 may be able to indicate additional information to the authorization system(s) 140 that may help its authorization operations 142. The commerce platform system(s) 110 may have data available to it (e.g., as a result of its interactions with the merchant system(s) 120) that is not available to the authorization system(s) 140. The risk indicator 180 may provide aspects of that data so as to improve the amount of information available to the authorization system(s) 140 so that it may make its authorization decision.

Figure 2:
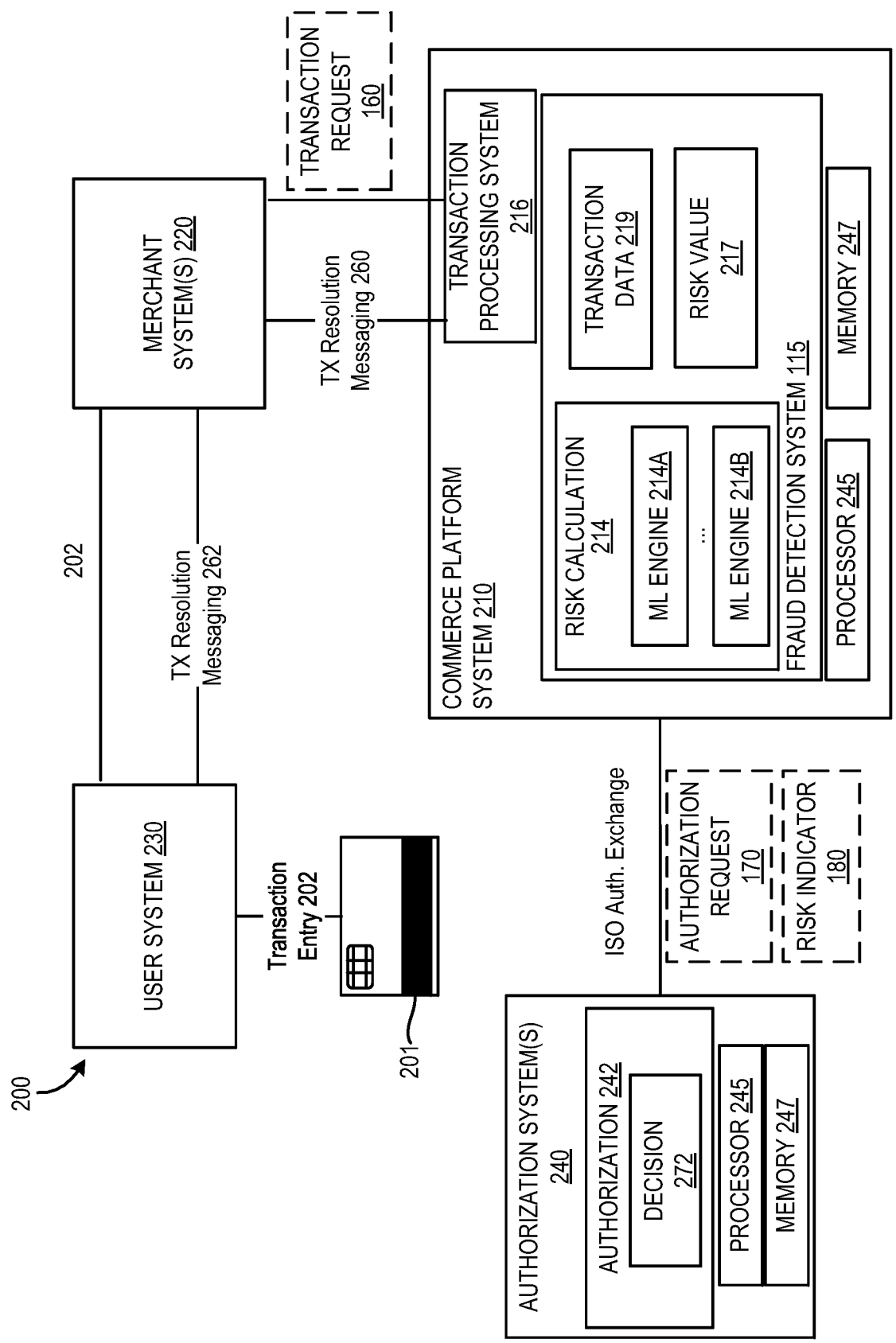
FIG. 2 is a block diagram of one embodiment of a commerce platform system and authorization system exchanging a risk indicator, in accordance with some embodiments of the present disclosure.

FIG. 2 is a block diagram of a system 200 incorporating a commerce platform system 210 and authorization system 240 exchanging a risk indicator 180, in accordance with some embodiments of the present disclosure. Commerce platform system 210 and authorization system 240 provide additional details for the commerce platform system(s) 110 and authorization system(s) 140, respectively, discussed herein with respect to FIG. 1. A description of elements of FIG. 2 that have been previously described herein will be omitted for brevity.

The commerce platform system 210 and authorization system 240 may include one or more processing devices 245, memory 247, which may include volatile memory devices (e.g., random access memory (RAM)), non-volatile memory devices (e.g., flash memory) and/or other types of memory devices, and one or more network interfaces. It should be noted that although, for simplicity, a single processing device 245 is depicted in each of the commerce platform system 210 and authorization system 240 depicted in FIG. 2, other embodiments of the commerce platform system 210 and authorization system 240 may include multiple processing devices, storage devices, or other devices.

Processing device 245 may include a complex instruction set computing (CISC) microprocessor, reduced instruction set computing (RISC) microprocessor, very long instruction word (VLIW) microprocessor, or a processor implementing other instruction sets or processors implementing a combination of instruction sets. Processing device 245 may also include one or more special-purpose processing devices such as an application specific integrated circuit (ASIC), a field programmable gate array (FPGA), a digital signal processor (DSP), network processor, or the like. Different ones of the commerce platform system 210 and authorization system 240 may have different types of processing device 245.

Referring to FIG. 2, a user system 230 may initiate a transaction between the user system 230 and a merchant system 220, such as for purchase of goods or services offered by the merchant system 220. As part of the transaction, user system 230 may collect transaction data entry 202 from a customer of the merchant. For example, the transaction data entry 202 may include at least payment information for use during the transaction. In some embodiments, the transaction data entry 202 may enable the generation of a card not present (CNP) transaction that may enable the merchant system 220 to process the transaction despite not having physical access to a card 201 (e.g., a credit card) to be used for the transaction. The transaction data entry 202 may be transmitted to the merchant system 220.

Merchant system 220 may receive the transaction data entry 202, and may generate a transaction request 160 including at least part of the transaction data entry 202 and one or more transaction parameters (e.g., transaction time, amount, type of card used, etc.). The transaction request 160 is then communicated to commerce platform system 210.

Commerce platform system 210 may receive the transaction request 160 at transaction processing system 216. Transaction processing system 216 may provide elements of transaction request 160 to fraud detection system 115. Fraud detection system 115 may utilize a risk calculation engine 214 to generate a risk value 217 that is associated with the transaction request 160 (e.g., as part of an authentication operation of the commerce platform system 210).

In some embodiments, fraud detection system 115 may utilize one or more machine learning (ML) engines 214A, 214B and/or transaction data history 219 to generate the risk value 217 based on the transaction request 160. For example, in some embodiments, ML engines 214A, 214B may be generated (e.g., trained) based on transaction data 219 containing transaction records associated with prior fraud detection. Though only two ML engines 214A, 214B are illustrated in FIG. 2, the embodiments of the present disclosure are not limited to this configuration.

In some embodiments, the models used by ML engine(s) 214A and 214B can at least partially be created offline using features extracted from the transaction data history 219, as well as traditional user-based features, and transaction requests 160 associated with prior fraud detection. In embodiments, ML engine(s) 214A and 214B can be trained using training data based on the transaction data history 219, and may further be refined over time based on future transactions for which no fraud was detected and no fraud existed, no fraud was detected but fraud did exist, fraud was detected and no fraud existed, fraud was detected and fraud did exist. In some embodiments, such training data may be gathered from the transaction data history 219. In some embodiments, one or more ML training techniques appropriate for a given model may be executed by ML engine(s) 214A and 214B periodically as new/additional training data becomes available, as well as in real-time using, for example, session data and transaction data as transactions occur.

The specific models used for a predicting the likelihood of fraud using the transaction request 160 may vary based on factors such as whether a user has been uniquely identified (e.g., using identifying detail like customer email, phone number, user id (UID)), the extent to which information about the user can be automatically collected (e.g., using cookies, client-side libraries), the extent to which the user has a transaction history, and other factors.

Though the use of ML engines 214A, 214B are illustrated as part of the risk calculation engine 214, the specific operations of the risk calculation engine 214 are not limited to machine learning. In some embodiments, the risk calculation engine may utilize other techniques, such as rule-based analysis in addition to, or instead of, machine learning to generate risk value 217. Risk value 217 may indicate, e.g., numerically, a determined risk associated with the transaction request 160.

The commerce platform system 210 may generate an authorization request 170 to the authorization system 240 related to the transaction request 160. In some embodiments, the authorization request 170 may be compliant with one or more International Organization for Standardization (e.g., ISO) protocols. In some embodiments, the authorization request 170 may be compliant with ISO 8583. ISO 8583 is an international standard for financial transaction card-originated interchange messaging. ISO 8583 may be utilized to authorize electronic transactions initiated by cardholders using payment cards. ISO 8583 defines a message format and a communication flow so that different systems can exchange transaction requests and responses.

In some embodiments, the commerce platform system 210 may exchange a risk indicator 180 as part of, or in addition to, the authorization request 170. In some embodiments, the risk indicator 180 may be or correspond to the risk value 217 calculated by the risk calculation engine 214 of the commerce platform system 210. In some embodiments, the risk indicator 180 may be a value that indicates that the risk value 217 calculated by the risk calculation engine 214 of the commerce platform system 210 has exceeded a particular threshold.

In response to the authorization request 170 and the risk indicator 180, the authorization system 240 may perform an authorization operation 242. As part of the authorization operation 242, the authorization system 240 may determine whether the transaction request 160 is authorized. In some embodiment, the authorization system 240 may utilize the risk indicator 180 as part of its authorization operation 242. That is to say that the authorization system 240 will adjust a decision 272 (e.g., whether to allow or reject the transaction request 160) based at least in part on the risk indicator 180. The decision 272 with respect to the authorization request 170 may be returned to the commerce platform system 210. The availability of the risk indicator 180 may allow for the authorization system 240 to have additional information to perform the authorization operation 242. For example, the availability of the risk indicator 180 may provide the authorization system 240 with additional data with respect to the operations and/or result of the risk calculation engine 214, which may improve an accuracy of the decision 272 of the authorization system 240.

Once a decision 272 has been generated on the transaction request 160, commerce platform system 210 may generate one or more transaction resolution messages 260 (e.g., authorizations, remunerations, etc.), which are returned to merchant system(s) 220 and reference the transaction associated with the transaction request 160. Merchant system 220 may in turn provide transaction resolution messaging 262 to the user system 230 (e.g., indicating a success or failure of the transaction associated with the transaction request 160.

Figure 3A:
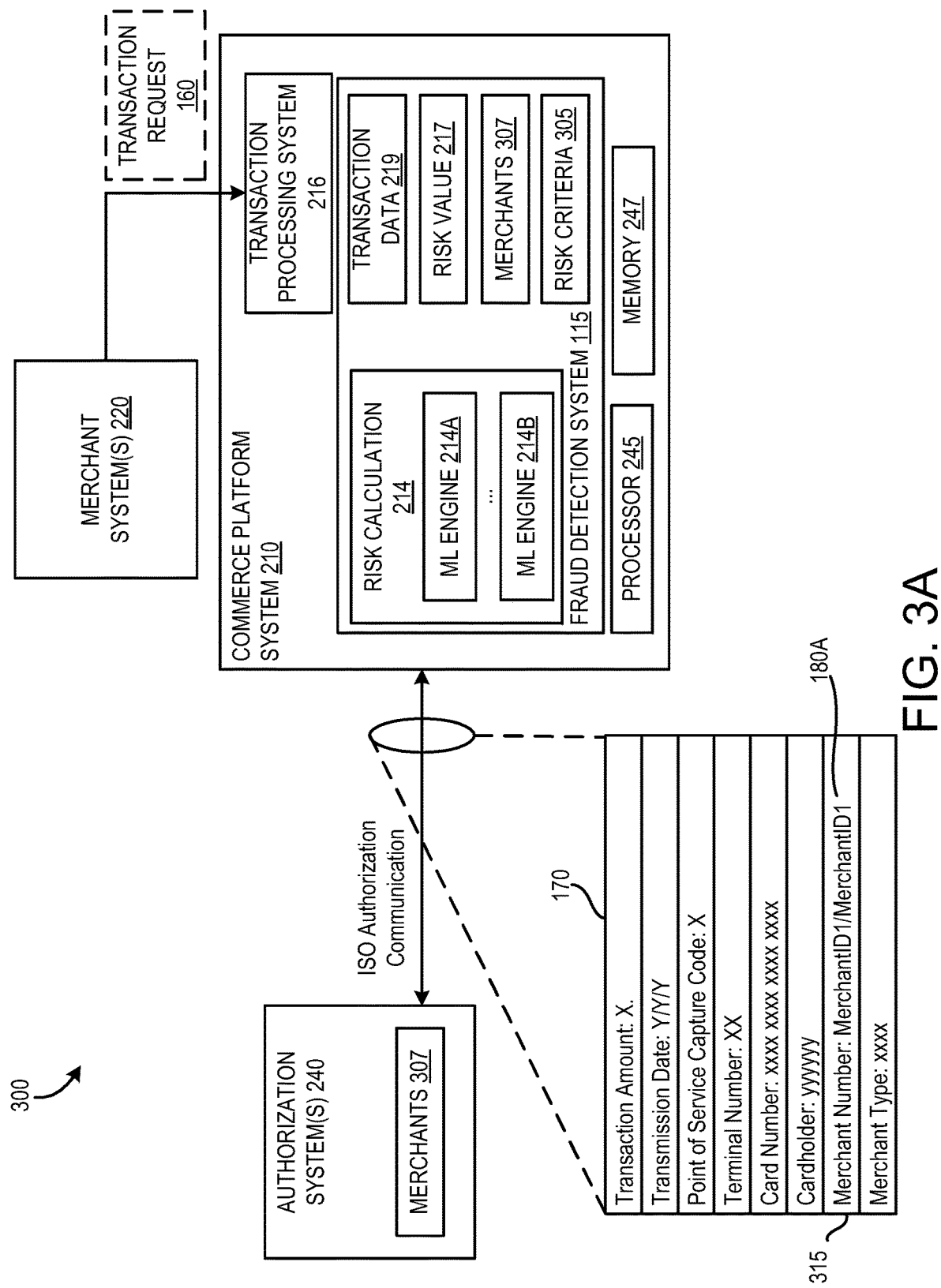
FIG. 3A is a schematic block diagram illustrating an embodiment of a system architecture for utilizing a risk indicator as part of an authorization request, in accordance with some embodiments of the present disclosure.

FIG. 3A is a schematic block diagram illustrating an embodiment of a system architecture 300 for utilizing a risk indicator 180A as part of an authorization request, in accordance with some embodiments of the present disclosure. A description of elements of FIG. 3A that have been previously described herein will be omitted for brevity.

Referring to FIG. 3A, a system architecture 300 may include a commerce platform system 210 having memory 247 and processing device 245. As described herein with respect to the prior figures, a transaction processing system 216 of the commerce platform system 210 may be configured to receive a transaction request 160. In response to the transaction request 160, the commerce platform system 210 may be configured to calculate a risk value 217 for the transaction request 160. For example, a risk calculation engine 214 of a fraud detection system 115 may be configured to calculate a risk value 217 for the transaction request 160 based on one or more ML engines 214A, 214B and/or transaction data 219. In some embodiments, the transaction data 219 may include data extracted from one or more prior transaction requests 160.

In some embodiments, the commerce platform system 210 may transmit a communication including an authorization request 170 to an authorization system 240. In some embodiments, the authorization request 170 may be compliant with ISO 8583. To be compliant with ISO 8583, the authorization request 170 may include a plurality of fields at predetermined locations in a manner understood by both the commerce platform system 210 and the authorization system 240.

For example, the authorization request 170 may include fields for a transaction amount of the underlying transaction of the transaction request 160, a transmission date of the transaction request 160, a point of service capture code, a terminal number (also referred to as a terminal identification), a card number (e.g., a card used for the underlying transaction of the transaction request 160), a cardholder name, a merchant number (also referred to as a merchant identification), and a merchant type. The fields for the authorization request 170 are for illustration purposes only and are not intended to identify all of the elements of the authorization request 170. It will be understood that additional and/or different field may be present in the transaction request without deviating from the embodiments of the present disclosure.

In some embodiments, a merchant number data field 315 (also referred to herein as a merchant identification) of the authorization request 170 may be utilized to transmit a risk indicator 180A to the authorization system(s) 240. For example, the authorization request 170 may include a different merchant identification for a same merchant within the merchant number data field 315 as the risk indicator 180A depending on a level of the risk value 217 calculated by the commerce platform system 210.

In some embodiments, the commerce platform system 210 may calculate the risk value 217 and compare the risk value 217 to one or more risk criteria 305. In some embodiments, the risk criteria 305 may include one or more risk thresholds and/or risk ranges. Depending on where the risk value 217 falls with respect to the risk criteria 305, a different merchant number may be utilized for the merchant number data field 315 as the risk indicator 180A.

For example, the commerce platform system 210 may establish a risk threshold as the risk criteria 305 for incoming transaction requests 160. The risk threshold may establish a boundary between a high-risk transaction and a low-risk transaction. In some embodiments, the commerce platform system 210 may compare the calculated risk value 217 to the risk threshold as part of the risk criteria 305. If the calculated risk value 217 is higher than risk threshold (e.g., a high-risk transaction) a first merchant identification (ID) may be used (e.g., MerchantID1). If the calculated risk value 217 is not higher than risk threshold (e.g., a low-risk transaction) a second merchant ID may be used (e.g., MerchantID2). In some embodiments, the merchant IDs may be selected from a merchant database 307 maintained on the commerce platform system 210. The merchant database 307 may indicate that both merchant IDs (MerchantID1 and MerchantID2) are associated with a same merchant (e.g., "MerchantA"). It will be understood that "MerchantID1" and "MerchantID2" may refer to different numerical values. Each of the different numerical values for the merchant number data field 315 may refer to a same merchant (e.g., a merchant associated with the merchant system 220), but may represent a different level of risk for the transaction request 160. The selected merchant ID (e.g., the first merchant ID or the second merchant ID) may be placed in the merchant number data field 315 of the authorization request 170 as the risk indicator 180A.

Though the prior example utilized only two values for the merchant ID, it will be understood that the present disclosure is not limited to that configuration. In some embodiments, the risk criteria 305 may include a plurality of risk intervals. For example, if the calculated risk value 217 is within a first range (e.g., between 1 and X), a first merchant ID may be used, if the calculated risk value 217 is within a second range (e.g., between X and Y), a second merchant ID may be used, if the calculated risk value 217 is within a third range (e.g., between Y and Z), a third merchant ID may be used, and so on. Thus, a plurality of merchant IDs may refer to a same merchant (e.g., a merchant associated with the merchant system 220 as illustrated in FIG. 2), but may represent a different level of risk for the transaction request 160.

In some embodiments, the authorization system 240 may indicate to the commerce platform system 210 whether it supports receiving the risk indicator 180A as part of the authorization request 170. The commerce platform system 210 may utilize the plurality of merchant IDs as the risk indicator 180A within the authorization request 170 responsive to determining that the authorization system 240 supports the functionality.

When the authorization system 240 receives the authorization request 170, it may parse the selected merchant ID as the risk indicator 180A from the merchant number data field 315. The authorization system 240 may also contain a merchant database 307. The authorization system 240 may compare the merchant ID from the merchant number data field 315 to the merchant database 307 to determine both an identification of a merchant associated with the authorization request 170 as well as a relative risk for the authorization request 170 as calculated by the commerce platform system 210. Stated a different way, the authorization system 240 may be able to detect, based on which merchant ID was used for a given merchant in the merchant number data field 315, a relative risk value for the authorization request 170.

Referring to the prior example, the authorization system 240 may detect that the merchant number data field 315 contains the value "MerchantID1." Based on the merchant database 310, the authorization system 240 may determine that MerchantID1 is associated with "MerchantA" and the selection of MerchantID1 for the merchant number data field 315 indicates that the risk value calculated by the commerce platform system 210 was higher than the risk criteria 305 (e.g., was deemed to be a high-risk transaction).

The embodiments described herein allow a way for the authorization system 240 to receive risk information (e.g., by way of risk indicator 180A) about a transaction associated with an authorization request 170 despite the fact that the legacy authorization request (e.g., the ISO 8583 protocol) does not support such a value. The technique illustrated in FIG. 3A allows for the expansion of the functionality of the authorization system 240 without requiring the adoption of a new protocol. In addition, the embodiments of the present disclosure may allow the authorization system 240 to acquire additional input (e.g., the risk indicator 180A) that may make its authorization decision more accurate, which may reduce a number of false positives and/or false negatives in the outcomes of the operations of the authorization system 240.

In some embodiments, the authorization system 240 may determine if the commerce platform system 210 supports the transmission of the risk indicator 180A as part of the authorization request 170 based on a source of the authorization request 170. For example, a code or other data field of the authorization request 170 may indicate that the commerce platform system 210 supports providing a risk indicator 180A as part of the authorization request 170. The authorization system 240 may examine the merchant number data field 315 to identify the risk indicator 180A responsive to determining that the commerce platform system 210 supports the functionality.

Though the embodiment of FIG. 3A utilizes the merchant number field of the authorization request 170 as the risk indicator 180A, the embodiments of the present disclosure are not limited to such a configuration. It will be understood that other fields of the authorization request 170 could be used without deviating from the embodiments of the present disclosure. For example, the authorization system 240 and the commerce platform system 210 may maintain databases in which a plurality of alternate data values are maintained for a given original data value. The alternate data values may serve the purpose of both identifying the original data value and conveying a relative risk of the associated transaction request 160. For example, multiple terminal numbers may be maintained for a given terminal, where each of the multiple terminal numbers identifies a single terminal, but respective ones of the multiple terminal numbers convey a different level of calculated risk for the underlying transaction.

Figure 3B:
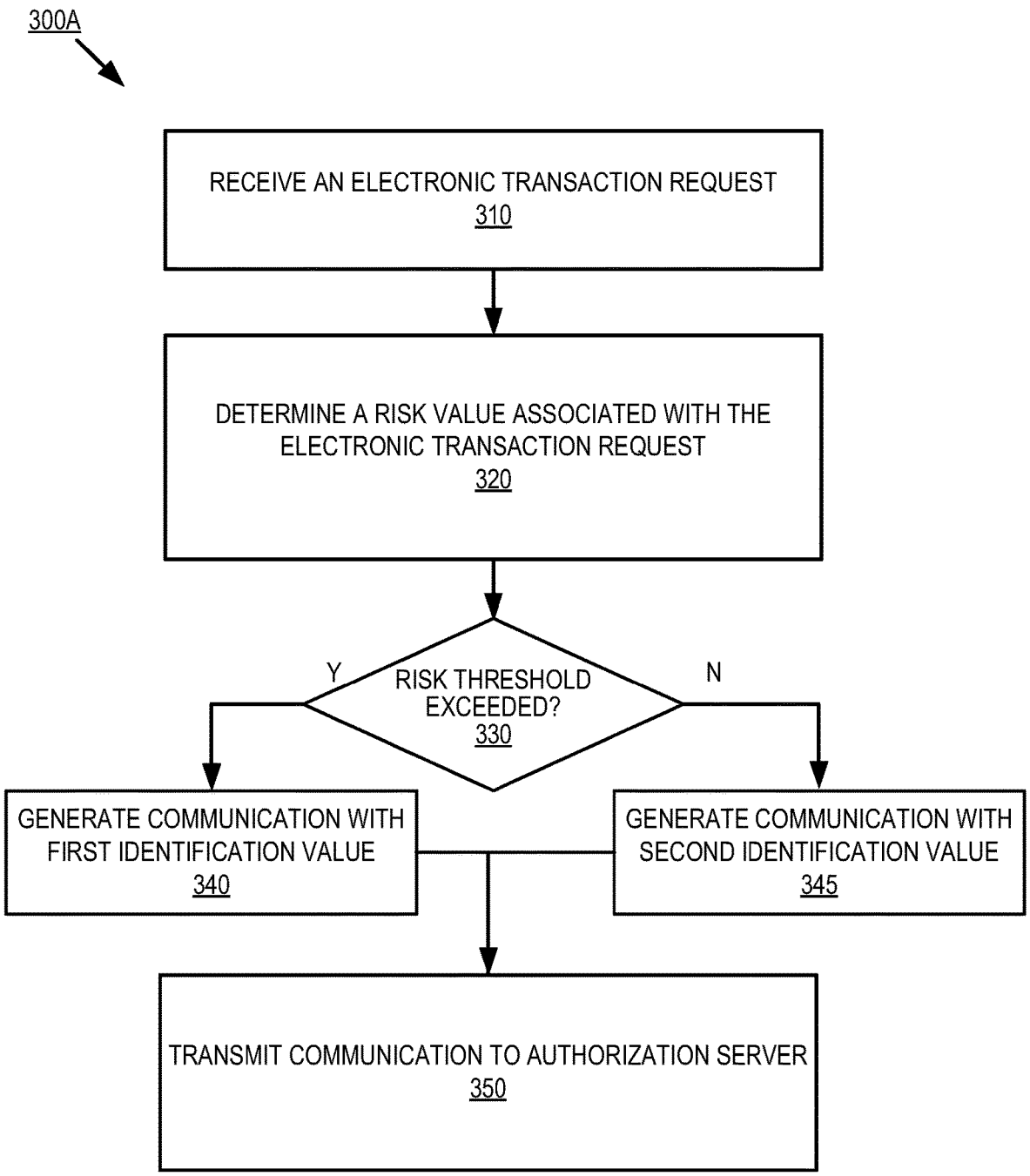
FIG. 3B is a flow diagram of one embodiment of a method for providing a risk indicator as part of an authorization request, in accordance with some embodiments of the present disclosure.

FIG. 3B is a flow diagram of one embodiment of a method 300A for providing a risk indicator 180A as part of an authorization request 170, in accordance with some embodiments of the present disclosure. The method 300A is performed by processing logic that may comprise hardware (circuitry, dedicated logic, etc.), software (such as is run on a general purpose computer system or a dedicated machine), firmware, or a combination. In one embodiment, the method 300A is performed by a commerce platform system (e.g., commerce platform system 110 or commerce platform system 210).

Referring to FIG. 3B, processing logic begins by receiving an electronic transaction request (processing block 310). In some embodiments, the electronic transaction request is received as part of authenticating a card-originated transaction between a merchant and a consumer. In some embodiments, the electronic transaction request is associated with a transaction that is a commercial transaction in which a commerce platform is used to run, clear, etc. a transaction, for example, on behalf of the merchant. In some embodiments, the transaction associated with the electronic transaction request is a card-not-present (CNP) transaction.

Processing logic determines a risk value associated with the electronic transaction request (processing block 320). In some embodiments, the risk value may be determine based on characteristics of the electronic transaction request. In some embodiments, processing logic may use one or more pieces of the electronic transaction request to determine the risk value.

Processing logic compares the risk value to a risk threshold (e.g., a risk criteria) to determine if the risk threshold is exceeded (processing block 330). In some embodiments, the risk threshold may be a numeric value. In some embodiments, the risk threshold may be one of several ranges of values representing relative risk of the electronic transaction request.

In response to the risk value exceeding the risk threshold, processing logic generates a communication with a first identification value (processing block 340). In some embodiments, the first identification value may be a first of a plurality of merchant identification values corresponding to a same merchant. In some embodiments, the first identification value is selected to indicate that the risk value that was calculated exceeded the risk threshold. In some embodiments, the communication is compliant with a communication protocol for authorization messages associated with card-originated transactions. In some embodiments, the first data field is a data field of the communication protocol that is designated to communicate data other than a risk indicator, such as within a field corresponding to a merchant ID field of the ISO 8583 protocol.

In response to the risk value not exceeding the risk threshold, processing logic generates a communication with a second identification value (processing block 345). In some embodiments, the second identification value may be a second of a plurality of merchant identification values corresponding to a same merchant. In some embodiments, the second identification value is selected to indicate and/or represent that the risk value that was calculated did not exceed the risk threshold. In some embodiments, the second identification value is placed at a predetermined location within a communication of a legacy protocol, such as within a field corresponding to a merchant ID field of the ISO 8583 protocol.

Processing logic transmits the communication to an authorization server (processing block 350). In some embodiments, the communication is an authorization request between the commerce platform system and the authorization server. In some embodiments, the communication causes the authorization device to make an authorization decision with regard to the communication based at least in part on contents of the first data field.

Figure 3C:
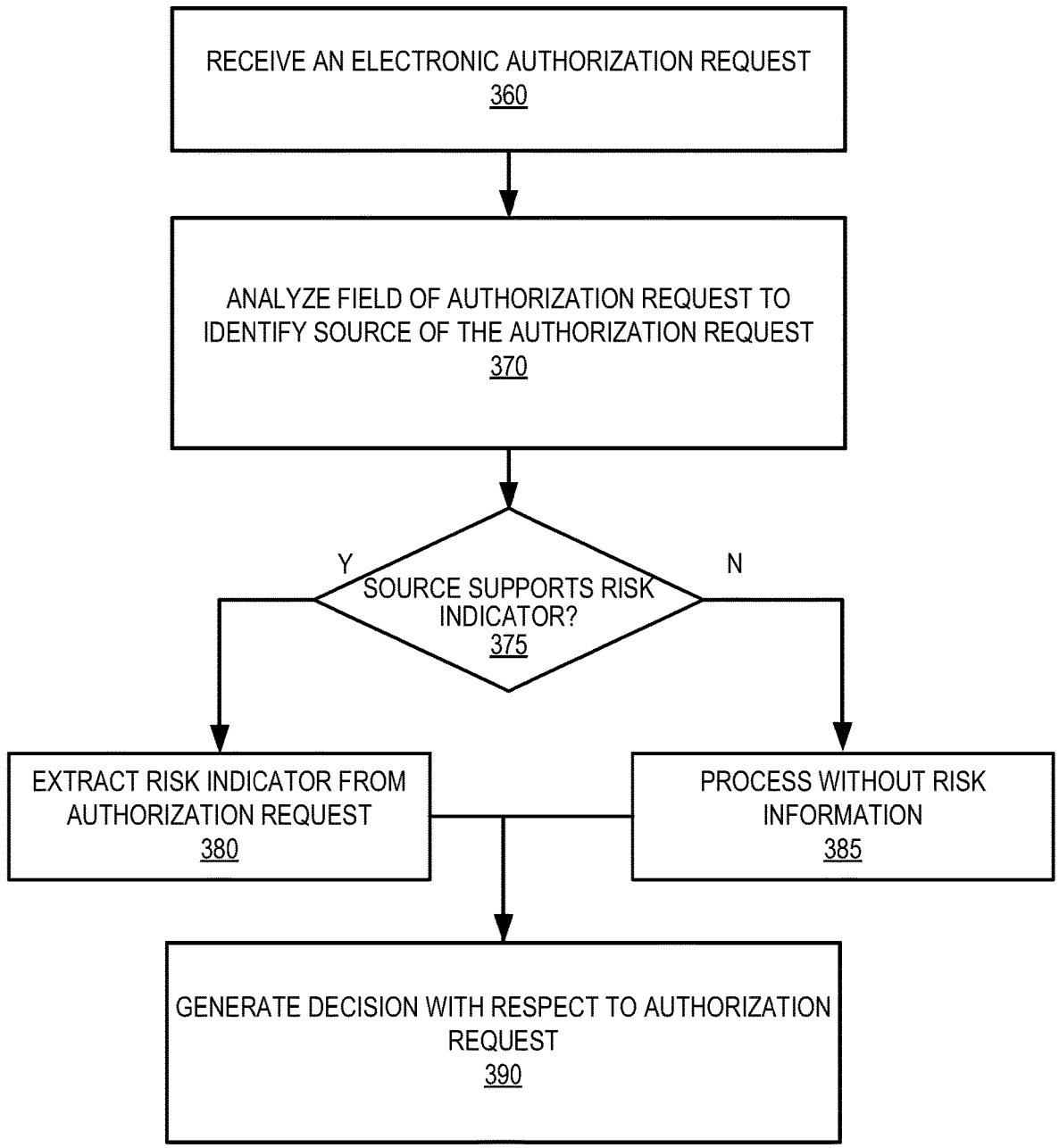
FIG. 3C is a flow diagram of one embodiment of a method for receiving a risk indicator as part of an authorization request, in accordance with some embodiments of the present disclosure.

FIG. 3C is a flow diagram of one embodiment of a method 300B for receiving a risk indicator 180A as part of an authorization request 170, in accordance with some embodiments of the present disclosure. The method 300B is performed by processing logic that may comprise hardware (circuitry, dedicated logic, etc.), software (such as is run on a general purpose computer system or a dedicated machine), firmware, or a combination. In one embodiment, the method 300B is performed by an authorization system (e.g., authorization system 140 or authorization system 240).

Referring to FIG. 3C, processing logic begins by receiving an electronic authorization request (processing block 360). In some embodiments, the electronic authorization request is associated with a transaction that is a commercial transaction in which an authorization system is used to authorize a card-originated transaction between a merchant and a consumer. In some embodiments, the transaction associated with the electronic transaction request is a card-not-present (CNP) transaction.

Processing logic analyzes a field of the electronic authorization request to identify a source of the authorization request (processing block 370). In some embodiments, processing logic identifies the source of the electronic authorization request from one or more elements of the authorization request.

Processing logic determines if the source of the electronic authorization request supports transmitting a risk indicator as part of the authorization request (processing block 375).

In some embodiments, the risk indicator may be a field within the authorization request, when supported.

In response to determining that the source of the electronic authorization request supports transmitting a risk indicator as part of the authorization request, processing logic extracts the risk indicator from the electronic authorization request (processing block 380). In some embodiments, extracting the risk indicator may include extracting a first identification value of a plurality of identification values used within the electronic authorization request (e.g., a merchant identification data field) and comparing the first identification value to a data store to determine an identification associated with the transaction (e.g., a merchant identification) and a relative risk value for the transaction. The risk indicator may be used to process the electronic authorization request.

In response to determining that the source of the electronic authorization request does not support transmitting a risk indicator as part of the authorization request, processing logic processes the electronic authorization request without the risk information (processing block 385).

Processing logic generates a decision with regard to the electronic authorization request (processing block 390). In some embodiments, the decision may be based, at least in part, on the risk indicator, when present, extracted from the electronic authorization request. In some embodiments, the decision may be transmitted to the source of the electronic authorization request (e.g., the commerce platform system).

Figure 4A:
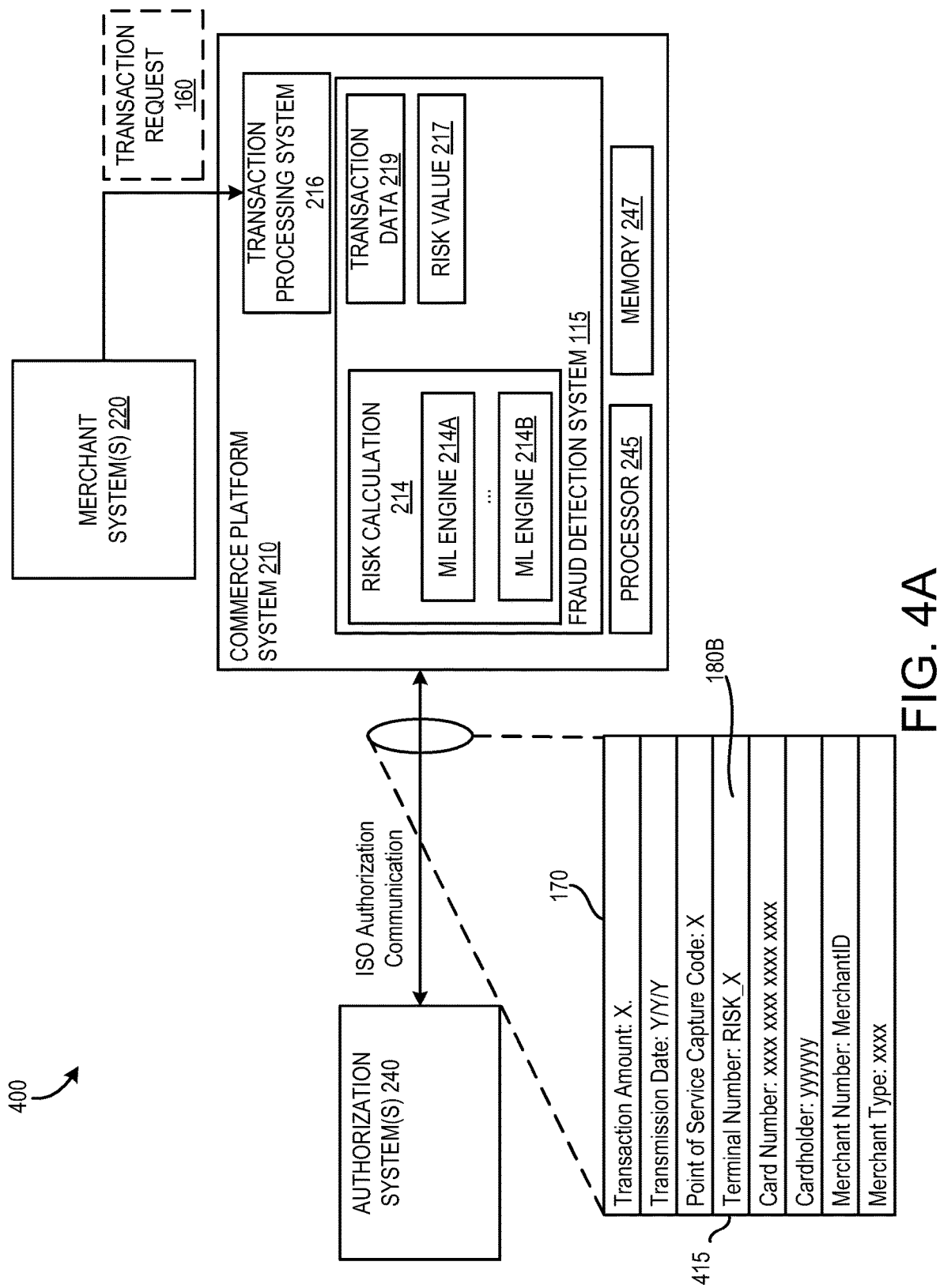
FIG. 4A is a schematic block diagram illustrating an embodiment of a system architecture for utilizing a risk indicator as part of an authorization request, in accordance with some embodiments of the present disclosure.

FIG. 4A is a schematic block diagram illustrating an embodiment of a system architecture 400 for utilizing a risk indicator 180B as part of an authorization request 170, in accordance with some embodiments of the present disclosure. A description of elements of FIG. 4A that have been previously described herein will be omitted for brevity.

Referring to FIG. 4A, a system architecture 400 may include a commerce platform system 210 having memory 247 and processing device 245. As described herein with respect to the prior figures, a transaction processing system 216 of the commerce platform system 210 may be configured to receive a transaction request 160. In response to the transaction request 160, the commerce platform system 210 may be configured to calculate a risk value 217 for the transaction request 160. For example, a risk calculation engine 214 of a fraud detection system 115 may be configured to calculate a risk value 217 for the transaction request 160 based on one or more ML engines 214A, 214B and/or transaction data 219. In some embodiments, the transaction data 219 may include data extracted from one or more prior transaction requests 160.

In some embodiments, the commerce platform system 210 may transmit a communication including an authorization request 170 to an authorization system 240. In some embodiments, the authorization request 170 may be compliant with ISO 8583. To be compliant with ISO 8583, the authorization request 170 may include a plurality of fields at predetermined locations in a manner understood by both the commerce platform system 210 and the authorization system 240. Examples of the fields of the ISO 8583 protocol have been described herein with respect to FIG. 3A, and a duplicate description thereof will be omitted.

In some embodiments, a predetermined data field 415 of the authorization request 170 may be utilized to transmit a risk indicator 180B to the authorization system(s) 240. For example, the authorization request 170 may include a one or more fields of the authorization request 170 whose value has been replaced with the calculated risk value 217. For example, in some embodiments, a field associated with a terminal id of the transaction request 160 may be replaced with a risk indicator 180B that is or includes the risk value 217. The predetermined data field 415 may be a field that would otherwise contain a data value within the ISO 8583 protocol that is different from the risk value 217. In some embodiments, the predetermined data field 415 may be a field of the authorization request 170 that is associated with a terminal number (also referred to herein as a terminal identification). The terminal number may be a numerical value that would otherwise indicate a terminal associated with the transaction request 160.

In some embodiments, the commerce platform system 210 may select a data field 415 of the authorization request 170 that is not being used for the particular authorization request 170. In some embodiments, the risk value 217 may be transformed before placing it in the data field 415. For example, if the risk value 217 is 'X', where X is a number, the commerce platform system 210 may generate a data value "RISK_X" as the risk indicator 180B. The data value may be placed within the data field 415. The format of the risk indicator 180B may, in some embodiments, allow the recipient of the authorization request 170 (e.g., the authorization system 240) to identify the risk indicator 180B.

In some embodiments, the authorization system 240 may indicate to the commerce platform system 210 whether it supports receiving the risk indicator 180B as part of the authorization request 170. The commerce platform system 210 may insert the risk indicator 180B within the authorization request 170 responsive to determining that the authorization system 240 supports the functionality.

When the authorization system 240 receives the authorization request 170, it may parse the calculated risk value 217 as the risk indicator 180B from the data field 415 of the authorization request 170. The authorization system may be able to identify the calculated risk value by transforming the data value within the data field 415 to recover the calculated risk value 217. Thus, the authorization system 240 may be able to determine with relative accuracy the exact risk value 217 that was calculated by the commerce platform system 210, and may use the risk value 217 make an authorization decision with regard to the authorization request.

Referring to the prior example, the authorization system 240 may extract the value "RISK_X" from the data field 415 of the authorization request 170. The authorization system 240 may transform the value extracted from the data field 415 to remove the portions added by the commerce platform system 210. Thus, the authorization system 240 may convert the value "RISK_X" to the numeric value X, which the authorization system 240 will identify as the calculated risk value 217 as the risk indicator 180B.

Though the above discussion describes the transmission of the calculated risk value 217, the embodiments of the present disclosure are not limited to this value. In some embodiments, additional data values may be transmitted as part of the risk indicator 180B within the authorization request 170. For example, the risk indicator 180B may include one or more of the following data points: the cardholder's IP address when making the transaction, the cardholder's email address as entered by the customer in a checkout flow of the merchant system 220, the cardholder's phone number as entered by the customer in the checkout flow of the merchant system 220, the cardholder's billing information as entered by the customer in the checkout flow of the merchant system 220, the cardholder's shipping information as entered by the customer in the checkout flow of the merchant system 220, and/or whether the commerce platform system 210 received a scanned image of the card used in the transaction.

In some embodiments, the configuration of FIG. 4A may be combined with the configuration of FIG. 3A. For example, in some embodiments, a portion of the risk indicator 180B may be provided as one of a plurality of identification values in a first data field, such as one of a plurality of merchant IDs, where different merchant IDs convey different levels of risk as described herein with respect to FIG. 3A. The risk indicator 180B may further include the calculated risk value in a second data field, such as the terminal ID field. Other fields within the authorization request 170 may include additional data as described above, such as whether the commerce platform system 210 received a scanned image of the card used in the transaction. Other combinations of the various embodiments described herein may be made without deviating from the scope of the present disclosure.

In some embodiments, each of the above-referenced data points may be entered in different fields of the authorization request 170. In some embodiments, the data points may be placed in fields that would be utilized for other purposes in systems that do not support the transmission of the risk indicator 180B. In some embodiments, the identification of which fields of the ISO-8583-compliant authorization request 170 will be utilized for the data fields of the risk indicator 180 may be identified in advance and coordinated between the commerce platform system 210 and the authorization system 240.

The embodiments described herein allow a way for the authorization system 240 to receive risk information (e.g., by way of risk indicator 180B) about a transaction associated with an authorization request 170 despite the fact that the legacy authorization request (e.g., the ISO 8583 protocol) does not support such a value. The technique illustrated in FIG. 4A allows for the expansion of the functionality of the authorization system 240 without requiring the adoption of a new protocol. In addition, the embodiments of the present disclosure may allow the authorization system 240 to acquire additional input (e.g., the risk indicator 180B) that may make its authorization decision more accurate, which may reduce a number of false positives and/or false negatives in the outcomes of the operations of the authorization system 240.

In some embodiments, the authorization system 240 may determine if the commerce platform system 210 supports the transmission of the risk indicator 180B as part of the authorization request 170 based on a source of the authorization request 170. For example, a code or other data field of the authorization request 170 may indicate that the commerce platform system 210 supports providing a risk indicator 180B as part of the authorization request 170. The authorization system 240 may examine the predetermined data field 415 to identify the risk indicator 180B responsive to determining that the commerce platform system 210 supports the functionality.

Figure 4B:
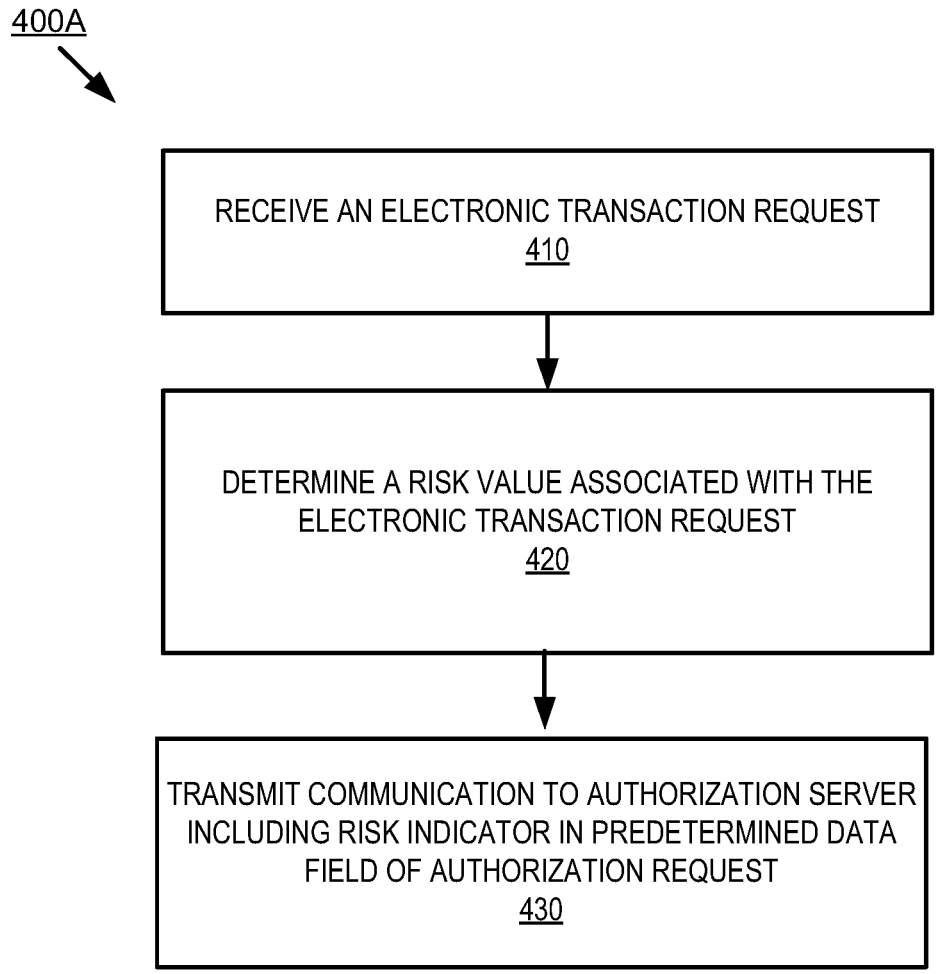
FIG. 4B is a flow diagram of one embodiment of a method for providing a risk indicator as part of an authorization request, in accordance with some embodiments of the present disclosure.

FIG. 4B is a flow diagram of one embodiment of a method 400A for providing a risk indicator 180B as part of an authorization request 170, in accordance with some embodiments of the present disclosure. The method 400A is performed by processing logic that may comprise hardware (circuitry, dedicated logic, etc.), software (such as is run on a general purpose computer system or a dedicated machine), firmware, or a combination. In one embodiment, the method 400A is performed by a commerce platform system (e.g., commerce platform system 110 or commerce platform system 210).

Referring to FIG. 4B, processing logic begins by receiving an electronic transaction request (processing block 410). In some embodiments, the electronic transaction request is received as part of authenticating a card-originated transaction between a merchant and a consumer. In some embodiments, the electronic transaction request is associated with a transaction that is a commercial transaction in which a commerce platform is used to run, clear, etc. a transaction, for example, on behalf of the merchant. In some embodiments, the transaction associated with the electronic transaction request is a card-not-present (CNP) transaction.

Processing logic determines a risk value associated with the electronic transaction request (processing block 420). In some embodiments, the risk value may be determine based on characteristics of the electronic transaction request. In some embodiments, processing logic may use one or more pieces of the electronic transaction request to determine the risk value.

Processing logic transmits a communication to an authorization server including a risk indicator in a predetermined data field of an authorization request (processing block 430). In some embodiments, the risk indicator may include a risk value. In some embodiments, the risk value may be a numeric value. In some embodiments, the risk value may be converted or otherwise modified before being placed into the communication. In some embodiments, the communication is compliant with a communication protocol for authorization messages associated with card-originated transactions. In some embodiments, predetermined data field is a data field of the communication protocol that is designated to communicate data other than a risk indicator, such as within a data field of the ISO 8583 protocol.

In some embodiments, the communication is an authorization request between the commerce platform system and the authorization server. In some embodiments, the predetermined data field may be a terminal identification of the electronic authorization request. In some embodiments, the risk indicator may include additional information related to the electronic transaction request such as the cardholder's IP address when making the transaction, the cardholder's email address as entered by the customer in a checkout flow of the merchant system, the cardholder's phone number as entered by the customer in the checkout flow of the merchant system, the cardholder's billing information as entered by the customer in the checkout flow of the merchant system, the cardholder's shipping information as entered by the customer in the checkout flow of the merchant system, and/or whether the commerce platform system received a scanned image of the card used in the transaction.

Figure 4C:
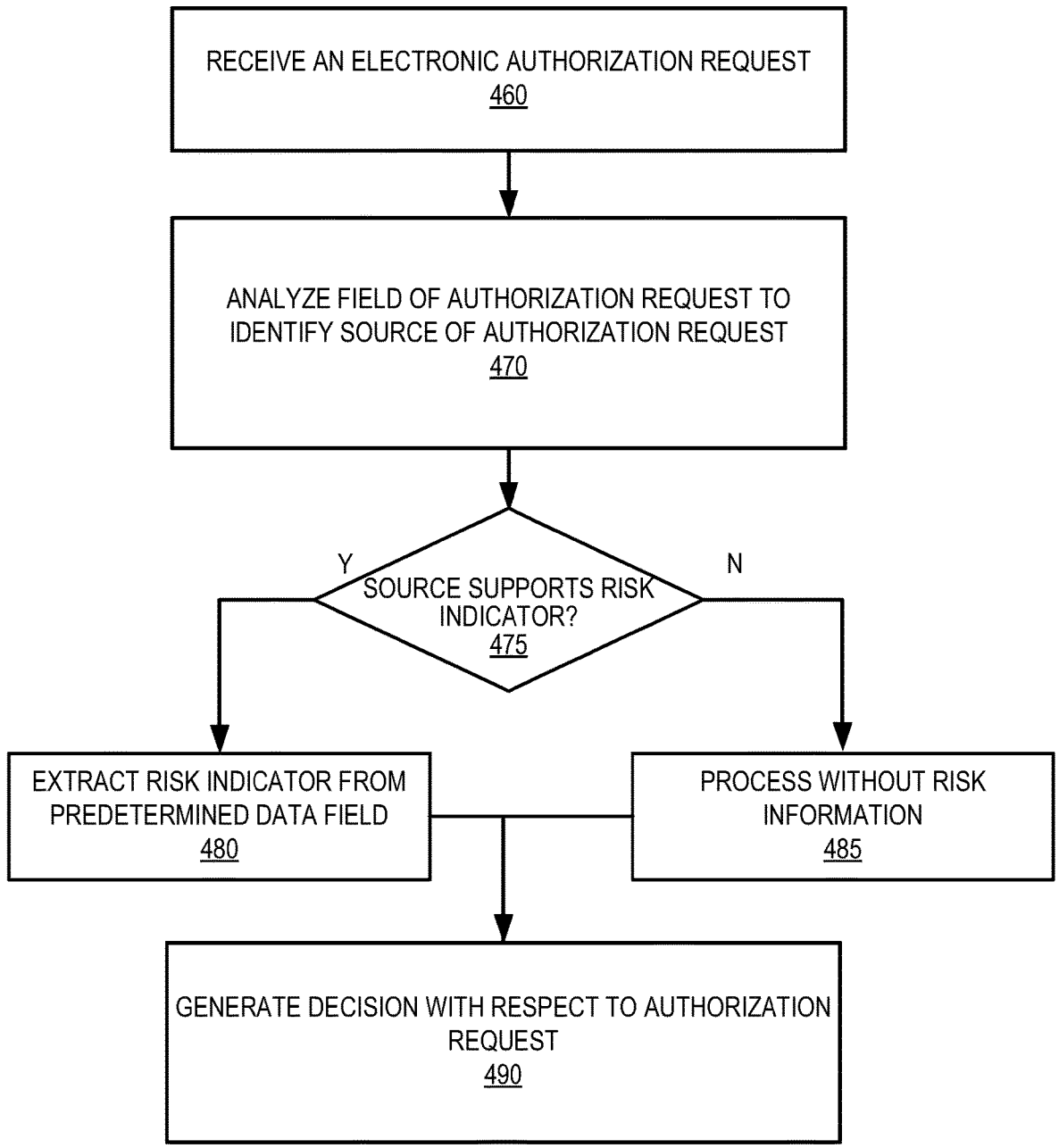
FIG. 4C is a flow diagram of one embodiment of a method for receiving a risk indicator as part of an authorization request, in accordance with some embodiments of the present disclosure.

FIG. 4C is a flow diagram of one embodiment of a method 400B for receiving a risk indicator 180B as part of an authorization request 170, in accordance with some embodiments of the present disclosure. The method 400B is performed by processing logic that may comprise hardware (circuitry, dedicated logic, etc.), software (such as is run on a general purpose computer system or a dedicated machine), firmware, or a combination. In one embodiment, the method 400B is performed by an authorization system (e.g., authorization system 140 or authorization system 240).

Referring to FIG. 4C, processing logic begins by receiving an electronic authorization request (processing block 460). In some embodiments, the electronic authorization request is associated with a transaction that is a commercial transaction in which the authorization system is used to authorize a card-originated transaction between a merchant and a consumer. In some embodiments, the transaction associated with the electronic transaction request is a card-not-present (CNP) transaction.

Processing logic analyzes a field of the electronic authorization request to identify a source of the authorization request (processing block 470). In some embodiments, processing logic identifies the source of the electronic authorization request from one or more elements of the authorization request.

Processing logic determines if the source of the electronic authorization request supports transmitting a risk indicator as part of the authorization request (processing block 475). In some embodiments, the risk indicator may be a field within the authorization request, when supported.

In response to determining that the source of the electronic authorization request supports transmitting a risk indicator as part of the authorization request, processing logic extracts the risk indicator from a predetermined data field the electronic authorization request (processing block 480). In some embodiments, extracting the risk indicator may include extracting a data value as the risk indicator from the predetermined data field and extracting a calculated risk value from the risk indicator. The risk value may be used to process the electronic authorization request.

In response to determining that the source of the electronic authorization request does not support transmitting a risk indicator as part of the authorization request, processing logic processes the electronic authorization request without the risk information (processing block 485).

Processing logic generates a decision with regard to the electronic authorization request (processing block 490). In some embodiments, the decision may be transmitted to the source of the electronic authorization request (e.g., the commerce platform system).

Figure 5A:
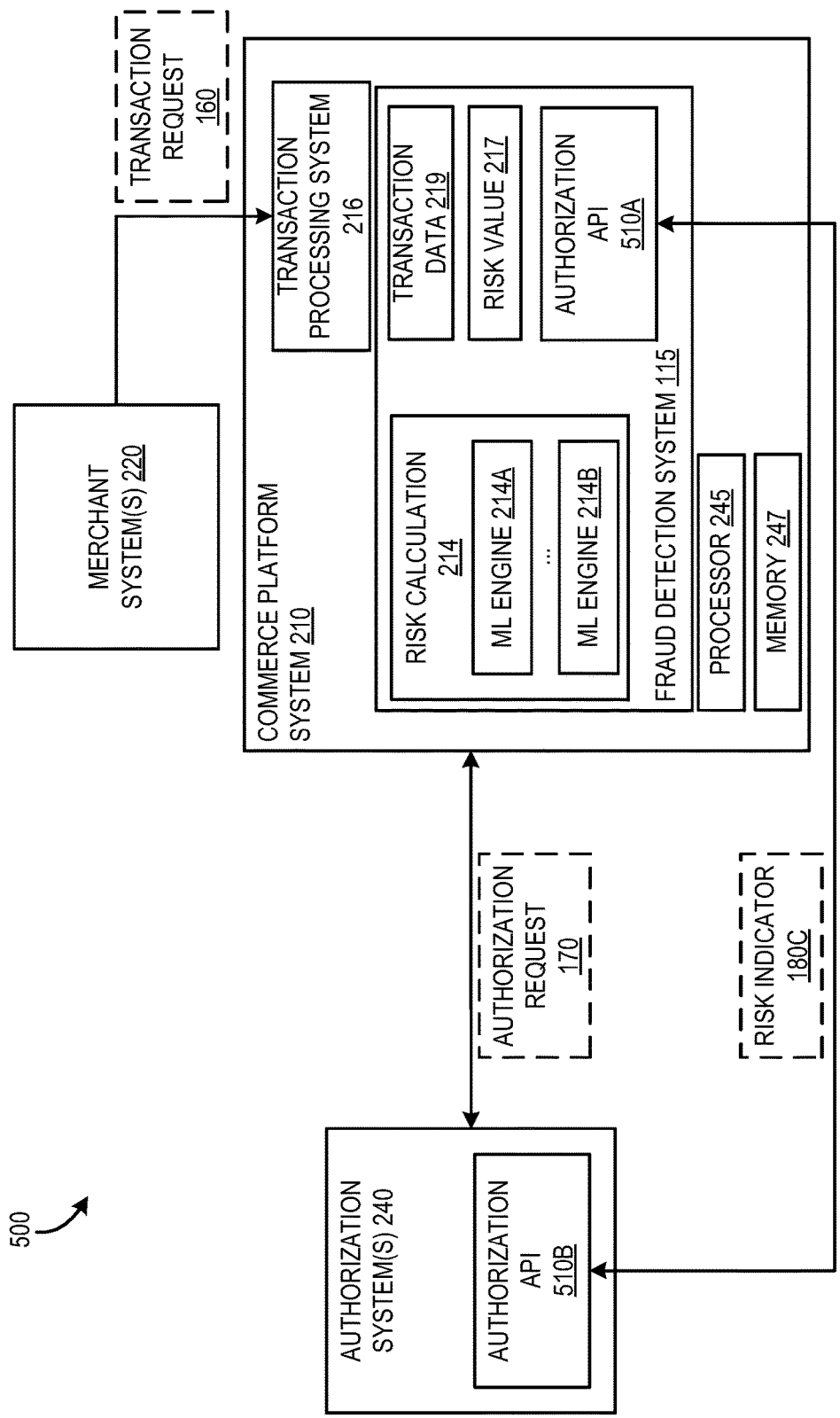
FIG. 5A is a schematic block diagram illustrating an embodiment of a system architecture for utilizing a risk indicator in parallel with an authorization request, in accordance with some embodiments of the present disclosure.

FIG. 5A is a schematic block diagram illustrating an embodiment of a system architecture 500 for utilizing a risk indicator 180C in parallel with an authorization request 170, in accordance with some embodiments of the present disclosure. A description of elements of FIG. 5A that have been previously described herein will be omitted for brevity.

Referring to FIG. 5A, a system architecture 400 may include a commerce platform system 210 having memory 247 and processing device 245. As described herein with respect to the prior figures, a transaction processing system 216 of the commerce platform system 210 may be configured to receive a transaction request 160. In response to the transaction request 160, the commerce platform system 210 may be configured to calculate a risk value 217 for the transaction request 160. For example, a risk calculation engine 214 of a fraud detection system 115 may be configured to calculate a risk value 217 for the transaction request 160 based on one or more ML engines 214A, 214B and/or transaction data 219. In some embodiments, the transaction data 219 may include data extracted from one or more prior transaction requests 160.

In some embodiments, the commerce platform system 210 may transmit a communication including an authorization request 170 to an authorization system 240. In some embodiments, the authorization request 170 may be compliant with ISO 8583. To be compliant with ISO 8583, the authorization request 170 may include a plurality of fields at predetermined locations in a manner understood by both the commerce platform system 210 and the authorization system 240. Examples of the fields of the ISO 8583 protocol have been described herein with respect to FIG. 3A, and a duplicate description thereof will be omitted.

In some embodiments, the authorization system 240 may export and/provide an authorization API 510B. The authorization API 510B may support access that provides additional information to the authorization system 240 to utilize for processing the authorization request 170. The authorization API 510B may be a programmatic interface that allows access by the commerce platform system 210. For example, the commerce platform system 210 may connect to the authorization API 510B over a network (such as network 102 illustrated in FIG. 1) via a known protocol.

In some embodiments, in parallel and/or concurrently with the transmission of the authorization request 170, the commerce platform system 210 may transmit a risk indicator 180C to the authorization system 240. In some embodiments, the risk indicator 180C may include the calculated risk value 217 that is calculated by the commerce platform system 210, but the embodiments of the present disclosure are not limited to solely transmitting the risk value 217. The authorization API 510B may utilize a different protocol than that used for the authorization request 170 (e.g., ISO 8583). Thus, the commerce platform system 210 may utilize a different protocol and/or transmission technique to transmit the risk indicator 180C than is used for the transmission of the authorization request 170.

In some embodiments, additional data related to the transaction request 160 may be transmitted utilizing the authorization API 510B. For example, the risk indicator 180C transmitted over the authorization API 510B may include one or more of the following data points: the cardholder's IP address when making the transaction, the cardholder's email address as entered by the customer in a checkout flow of the merchant system 220, the cardholder's phone number as entered by the customer in the checkout flow of the merchant system 220, the cardholder's billing information as entered by the customer in the checkout flow of the merchant system 220, the cardholder's shipping information as entered by the customer in the checkout flow of the merchant system 220, and/or whether the commerce platform system 210 received a scanned image of the card used in the transaction.

In some embodiments, the authorization system 240 may indicate to the commerce platform system 210 whether it supports the authorization API 510B. The commerce platform system 210 may transmit the risk indicator 180C using the authorization API 510B responsive to determining that the authorization system 240 supports the functionality.

In some embodiments, a data field may be transmitted utilizing the authorization API 510B that allows for correlation with the authorization request 170. The data field may allow the authorization system 240 to correlate a received authorization request 170 with data received via the authorization API 510B. In some embodiments, the authorization system 240 may correlate the received risk indicator 180C with a received authorization request 170 based on a time in which the elements are received.

When the authorization system 240 receives the authorization request 170, it may associate the data received via the authorization request 170 with the risk indicator 180C received via the authorization API 510B. The authorization system 240 may be able to identify one or more elements of the risk indicator 180C, such as the calculated risk value 217, that may impact the authorization decision with respect to the authorization request 170. For example, the authorization system 240 may be able to determine with relative accuracy the exact risk value 217 that was calculated by the commerce platform system 210 from the risk indicator 180C, and may use the risk value 217 make an authorization decision with regard to the authorization request 170. Similarly, the authorization system 240 may be able to retrieve other information related to the transaction request 160, such as the information related to the cardholder described herein or an indication as to whether the commerce platform system 210 received a scanned image of the card associated with the transaction request 160, that may further improve the quality of the analysis of the authorization request 170.

The embodiments described herein allow a way for the authorization system 240 to receive risk information and/or other data (e.g., by way of risk indicator 180C) about a transaction associated with an authorization request 170 despite the fact that the legacy authorization request (e.g., the ISO 8583 protocol) does not support the transmission of such risk information. The embodiments illustrated in FIG. 5A allow the authorization system 240 to acquire additional input (e.g., the risk indicator 180C) that may make its authorization decision more accurate, which may reduce a number of false positives and/or false negatives in the outcomes of the operations of the authorization system 240.

In some embodiments, the authorization API 510B may be bi-directional. For example, in some embodiments, the authorization system 240 may be able to provide additional information related to the authorization request 170 to the commerce platform system 210. For example, the commerce platform system 210 may export an authorization API 510A that allows a programmatic connection from the authorization system 240. The authorization system 240 may connect to authorization API 510A to provide additional data to the commerce platform system 210 that may be used to assist and/or enhance the fraud detection system 115 of the commerce platform system 210. For example, the authorization system 240 may be able to provide additional information to the commerce platform system 210 related to the cardholder associated with the transaction request 160 (e.g., additional addresses, account information, and the like) that may assist in determining a risk value 217 for the transaction request.

Though illustrated as an authorization API 510A being exported by the commerce platform system 210, the embodiments of the present disclosure are not limited to such a configuration. In some embodiments, the commerce platform system 210 may retrieve the additional information about the transaction request 160 from the authorization system 240 by connecting to the authorization API 510B exported by the authorization system 240 and requesting the information from the authorization system 240.

In some embodiments, the configuration of FIG. 5A may be combined with the configuration of FIGS. 3A and/or 4A. For example, in some embodiments, a portion of the risk indicator 180C may be provided as one of a plurality of identification values in a first data field, such as one of a plurality of merchant IDs, where different merchant IDs convey different levels of risk, as discussed herein with respect to FIG. 3A. The risk indicator 180C may further include the calculated risk value in a second data field, such as the terminal ID field, as discussed herein with respect to FIG. 4A. Additional data as described above, such as data related to the cardholder and/or whether the commerce platform system 210 received a scanned image of the card used in the transaction, may be provided utilizing the authorization API 510B. Other combinations of the various embodiments described herein may be made without deviating from the scope of the present disclosure.

Figure 5B:
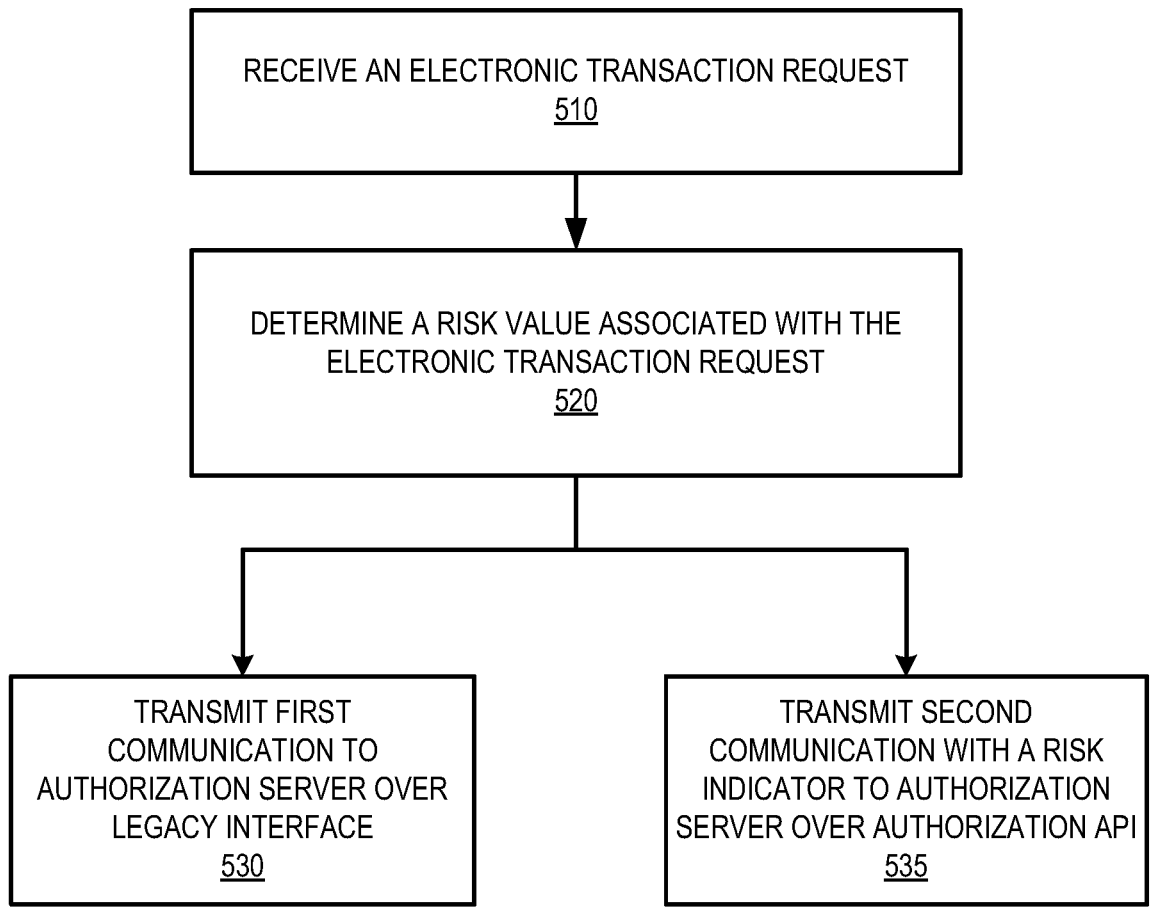
FIG. 5B is a flow diagram of one embodiment of a method for providing a risk indicator in parallel with an authorization request, in accordance with some embodiments of the present disclosure.

FIG. 5B is a flow diagram of one embodiment of a method 500A for providing a risk indicator 180C in parallel with an authorization request 170, in accordance with some embodiments of the present disclosure. The method 500A is performed by processing logic that may comprise hardware (circuitry, dedicated logic, etc.), software (such as is run on a general purpose computer system or a dedicated machine), firmware, or a combination. In one embodiment, the method 500A is performed by a commerce platform system (e.g., commerce platform system 110 or commerce platform system 210).

Referring to FIG. 5B, processing logic begins by receiving an electronic transaction request (processing block 510). In some embodiments, the electronic transaction request is received as part of authenticating a card-originated transaction between a merchant and a consumer. In some embodiments, the electronic transaction request is associated with a transaction that is a commercial transaction in which a commerce platform is used to run, clear, etc. a transaction, for example, on behalf of the merchant. In some embodiments, the transaction associated with the electronic transaction request is a card-not-present (CNP) transaction.

Processing logic determines a risk value associated with the electronic transaction request (processing block 520). In some embodiments, the risk value may be determine based on characteristics of the electronic transaction request. In some embodiments, processing logic may use one or more pieces of the electronic transaction request to determine the risk value.

Processing logic transmits a first communication to an authorization server over a legacy interface (processing block 530). In some embodiments, the legacy interface may utilize the ISO 8583 protocol. In some embodiments, the first communication is an authorization request between the commerce platform system and the authorization server.

Processing logic transmits a second communication with a risk indicator related to the electronic transaction request to the authorization server over an authorization API (processing block 535). In some embodiments, the risk indicator may include a risk value associated with the electronic transaction request. In some embodiments, the risk value may be a numeric value. In some embodiments, the risk indicator may include additional information related to the electronic transaction request such as the cardholder's IP address when making the transaction, the cardholder's email address as entered by the customer in a checkout flow of the merchant system, the cardholder's phone number as entered by the customer in the checkout flow of the merchant system, the cardholder's billing information as entered by the customer in the checkout flow of the merchant system, the cardholder's shipping information as entered by the customer in the checkout flow of the merchant system, and/or whether the commerce platform system received a scanned image of the card used in the transaction. In some embodiments, the second communication is made to an API exported by the authorization server.

Figure 5C:
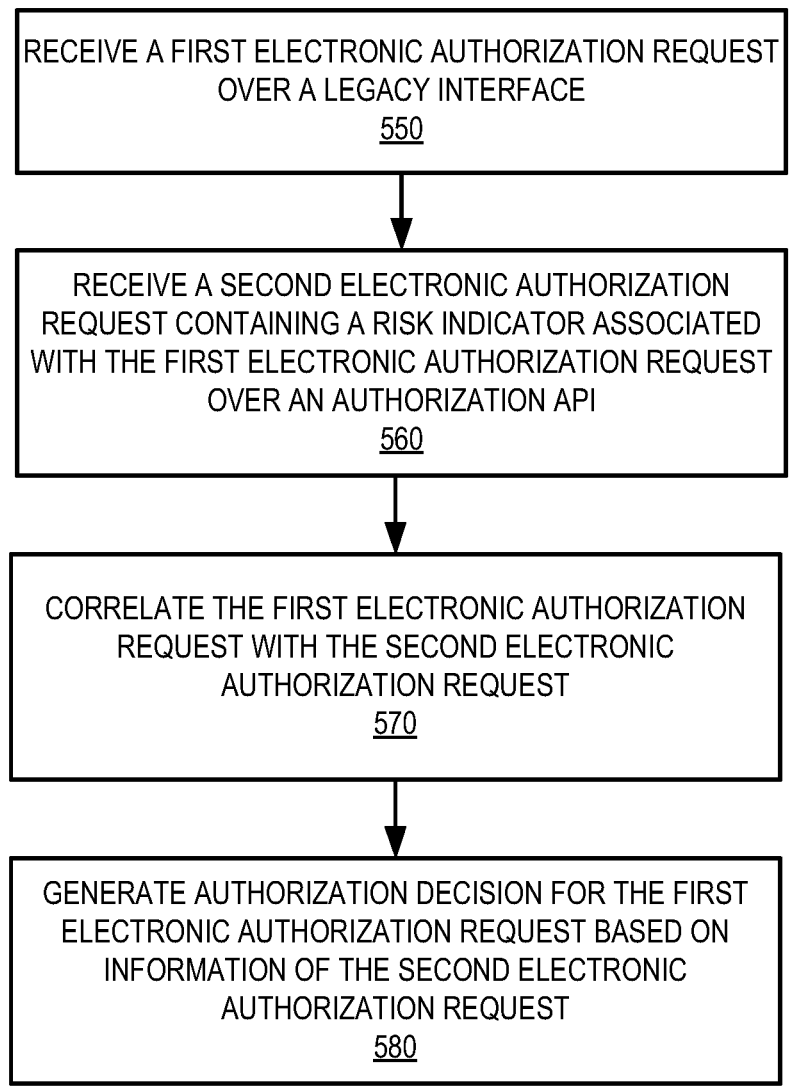
FIG. 5C is a flow diagram of one embodiment of a method for receiving a risk indicator in parallel with an authorization request, in accordance with some embodiments of the present disclosure.

FIG. 5C is a flow diagram of one embodiment of a method 500B for receiving a risk indicator 180C in parallel with an authorization request 170, in accordance with some embodiments of the present disclosure. The method 500B is performed by processing logic that may comprise hardware (circuitry, dedicated logic, etc.), software (such as is run on a general purpose computer system or a dedicated machine), firmware, or a combination. In one embodiment, the method 500B is performed by an authorization system (e.g., authorization system 140 or authorization system 240).

Referring to FIG. 5C, processing logic begins by receiving a first electronic authorization request over a legacy interface (processing block 550). In some embodiments, the first electronic authorization request is associated with a transaction that is a commercial transaction in which an authorization system is used to authorize a transaction, for example, on behalf of a merchant. In some embodiments, the legacy interface may utilize the ISO 8583 protocol.

Processing logic receives a second electronic authorization request containing a risk indicator that is associated with the first electronic authorization request over an authorization API (processing block 560). In some embodiments, the risk indicator may contain a risk value. In some embodiments, the risk indicator may contain one or more pieces of data related to the transaction associated with the first electronic transaction request such as the cardholder's IP address when making the transaction, the cardholder's email address as entered by the customer in a checkout flow of the merchant system, the cardholder's phone number as entered by the customer in the checkout flow of the merchant system, the cardholder's billing information as entered by the customer in the checkout flow of the merchant system, the cardholder's shipping information as entered by the customer in the checkout flow of the merchant system, and/or whether the commerce platform system received a scanned image of the card used in the transaction.

Processing logic correlates the first electronic authorization request with the second electronic authorization request (processing block 570). In some embodiments, the first electronic authorization request may be received in parallel with the second electronic authorization request. In some embodiments, data from one or more of the first electronic authorization request and the second electronic authorization request may be used to correlate the two requests.

Processing logic generates an authorization decision for the first electronic transaction request based on information (e.g., information of the risk indicator) of the second electronic transaction request (processing block 580). In some embodiments, the authorization decision may be transmitted to the source of the electronic authorization request (e.g., the commerce platform system).

Figure 6:
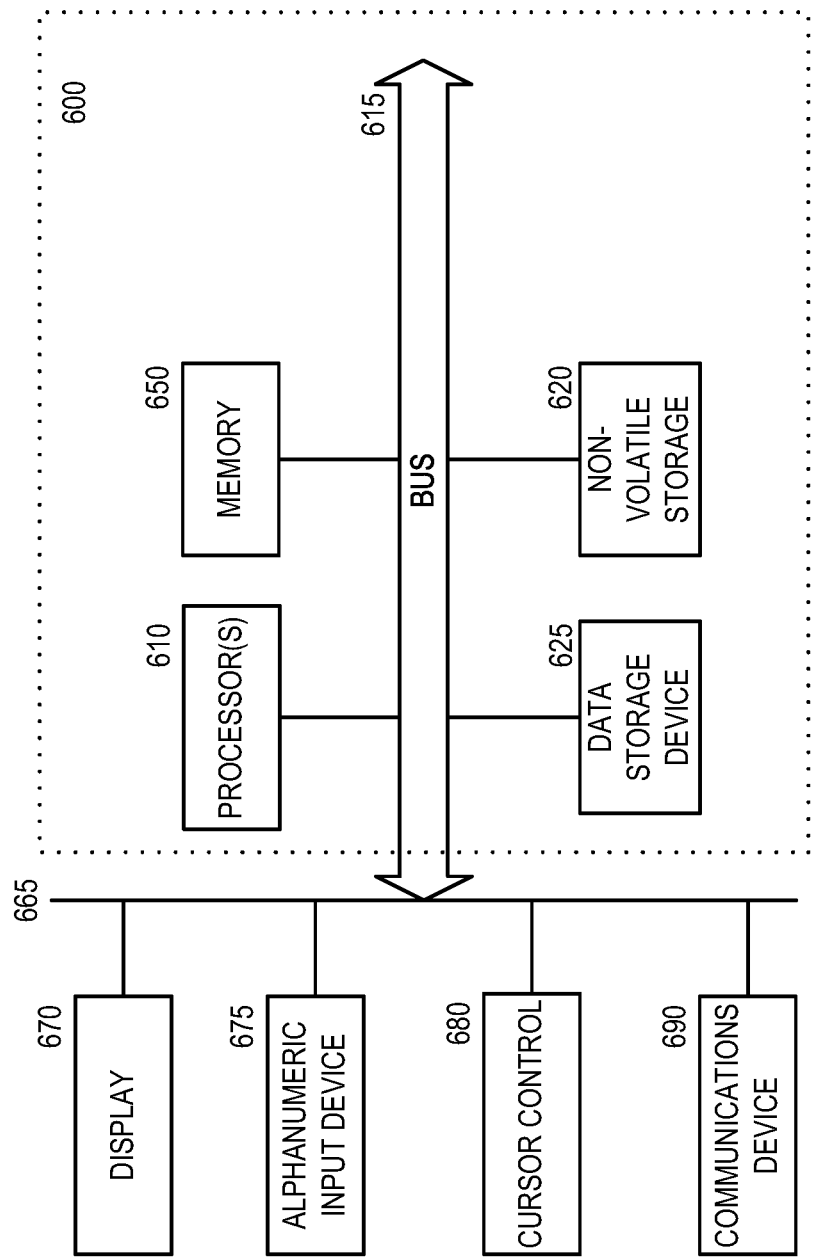
FIG. 6 is one embodiment of a computer system that may be used to support the systems and operations discussed herein.

FIG. 6 is one embodiment of a computer system that may be used to support the systems and operations discussed herein. For example, the computer system illustrated in FIG. 6 may be used by a commerce platform system, a merchant system, user system, etc. It will be apparent to those of ordinary skill in the art, however that other alternative systems of various system architectures may also be used.

The data processing system illustrated in FIG. 6 includes a bus or other internal communication means 615 for communicating information, and a processor 610 coupled to the bus 615 for processing information. The system further comprises a random access memory (RAM) or other volatile storage device 650 (referred to as memory), coupled to bus 615 for storing information and instructions to be executed by processor 610. Main memory 650 also may be used for storing temporary variables or other intermediate information during execution of instructions by processor 610. The system also comprises a read only memory (ROM) and/or static storage device 620 coupled to bus 615 for storing static information and instructions for processor 610, and a data storage device 625 such as a magnetic disk or optical disk and its corresponding disk drive. Data storage device 625 is coupled to bus 615 for storing information and instructions.

The system may further be coupled to a display device 670, such as a light emitting diode (LED) display or a liquid crystal display (LCD) coupled to bus 615 through bus 665 for displaying information to a computer user. An alphanumeric input device 675, including alphanumeric and other keys, may also be coupled to bus 615 through bus 665 for communicating information and command selections to processor 610. An additional user input device is cursor control device 680, such as a touchpad, mouse, a trackball, stylus, or cursor direction keys coupled to bus 615 through bus 665 for communicating direction information and command selections to processor 610, and for controlling cursor movement on display device 670.

Another device, which may optionally be coupled to computer system 600, is a communication device 690 for accessing other nodes of a distributed system via a network. The communication device 690 may include any of a number of commercially available networking peripheral devices such as those used for coupling to an Ethernet, token ring, Internet, or wide area network. The communication device 690 may further be a null-modem connection, or any other mechanism that provides connectivity between the computer system 600 and the outside world. Note that any or all of the components of this system illustrated in FIG. 6 and associated hardware may be used in various embodiments as discussed herein.

It will be appreciated by those of ordinary skill in the art that any configuration of the system may be used for various purposes according to the particular implementation. The control logic or software implementing the described embodiments can be stored in main memory 650, mass storage device 625, or other storage medium locally or remotely accessible to processor 610.

It will be apparent to those of ordinary skill in the art that the system, method, and process described herein can be implemented as software stored in main memory 650 or read only memory 620 and executed by processor 610. This control logic or software may also be resident on an article of manufacture comprising a computer readable medium having computer readable program code embodied therein and being readable by the mass storage device 625 and for causing the processor 610 to operate in accordance with the methods and teachings herein.

The embodiments discussed herein may also be embodied in a handheld or portable device containing a subset of the computer hardware components described above. For example, the handheld device may be configured to contain only the bus 615, the processor 610, and memory 650 and/or 625. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include a processor 610, a data storage device 625, a bus 615, and memory 650, and only rudimentary communications mechanisms, such as a small touch-screen that permits the user to communicate in a basic manner with the device. In general, the more special-purpose the device is, the fewer of the elements need be present for the device to function.

It is to be understood that the above description is intended to be illustrative, and not restrictive. Many other embodiments will be apparent to those of skill in the art upon reading and understanding the above description. The scope should, therefore, be determined with reference to the appended claims, along with the full scope of equivalents to which such claims are entitled.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting. As used herein, the term "and/or" includes any and all combination of one or more of the associated listed items.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

Various units, circuits, or other components may be described or claimed as "configured to" or "configurable to" perform a task or tasks. In such contexts, the phrase "configured to" or "configurable to" is used to connote structure by indicating that the units/circuits/components include structure (e.g., circuitry) that performs the task or tasks during operation. As such, the unit/circuit/component can be said to be configured to perform the task, or configurable to perform the task, even when the specified unit/circuit/component is not currently operational (e.g., is not on). The units/circuits/components used with the "configured to" or "configurable to" language include hardware—for example, circuits, memory storing program instructions executable to implement the operation, etc. Reciting that a unit/circuit/component is "configured to" perform one or more tasks, or is "configurable to" perform one or more tasks, is expressly intended not to invoke 35 U.S.C. 112, sixth paragraph, for that unit/circuit/component. Additionally, "configured to" or "configurable to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks. "Configurable to" is expressly intended not to apply to blank media, an unprogrammed processor or unprogrammed generic computer, or an unprogrammed programmable logic device, programmable gate array, or other unprogrammed device, unless accompanied by programmed media that confers the ability to the unprogrammed device to be configured to perform the disclosed function(s).

The foregoing description, for purpose of explanation, has been described with reference to specific embodiments. However, the illustrative discussions above are not intended to be exhaustive or to limit the described embodiments to the precise forms disclosed. Many modifications and variations are possible in view of the above teachings. The embodiments were chosen and described in order to best explain the principles and practical applications of the various embodiments, to thereby enable others skilled in the art to best utilize the various embodiments with various modifications as may be suited to the particular use contemplated.

What is claimed is:

1. A method comprising:
    storing, by a computing system, a transaction processing system, a fraud detection system comprising a risk calculation engine, and an authorization API in bidirectional communication over the network with an authorization system, wherein the risk calculation engine comprises at least one machine learning model and the transaction processing system is in communication with a merchant system over a network;
    executing, by the computing system, the fraud detection system;
    receiving, by the computing system via the transaction processing system, and over the network, a transaction request from the merchant system, wherein the transaction request comprises first transaction information, and sending, via the transaction processing system, the first transaction information to the executing fraud detection system;
    retrieving, by the computing system, from the authorization system, based on the transaction request, and via the authorization API, second transaction information;
    by the computing system, and via the executing fraud detection system:
        accessing the second transaction information;
        receiving from the transaction processing system the first transaction information;
        executing the risk calculation engine and calculating, via the executing calculation engine and utilizing the at least one machine learning model, a risk value for the transaction request based on the first transaction information and the second transaction information;
    generating, by the computing system, an authorization request based on the transaction request and transmitting, by the computing system, the authorization request to the authorization system over the network utilizing an ISO protocol;
    transmitting, by the computing system via the authorization API, and utilizing a non-ISO protocol, the risk value to the authorization system;
    receiving, by the computing system, over the network, and from the authorization system, an authorization decision;
    determining, by the computing system, whether to approve or deny the transaction request based, at least, on the received authorization decision; and
    transmitting, by the computing system, over the network, a resulting approval or denial determination to the merchant system.

2. The method according to claim 1, wherein the ISO protocol comprises a first data field that corresponds to a merchant identification associated with the transaction request.

3. The method according to claim 1, wherein executing the risk calculation engine and calculating, via the executing calculation engine and utilizing the at least one machine learning model comprises: selecting, by the executing calculation engine, the at least one machine learning model based on the first transaction information.

4. The method according to claim 3, wherein executing the risk calculation engine and calculating, via the executing calculation engine and utilizing the at least one machine learning model further comprises: applying, via the executing calculation engine, the at least one machine learning model to the first transaction information to calculate the risk value.

5. The method according to claim 1,
wherein the second transaction information comprises one or more of an internet protocol (IP) address associated with the transaction request, an email associated with the transaction request, a phone number associated with the transaction request, billing information associated with the transaction request, shipping information associated with the transaction request, or an indication whether a scanned image of a card associated with the transaction request was received.

6. The method according to claim 1, wherein the ISO protocol is an ISO 8583 protocol.

7. A non-transitory computer readable storage medium including instructions that, when executed by a processing device, causes the processing device to perform operations comprising:
storing a transaction processing system, a fraud detection system comprising a risk calculation engine, and an authorization API in bidirectional communication over the network with an authorization system, wherein the risk calculation engine comprises at least one machine learning model and the transaction processing system is in communication with a merchant system over a network;
executing the fraud detection system;
receiving, via the transaction processing system, and over the network, a transaction request from the merchant system, wherein the transaction request comprises first transaction information, and sending, via the transaction processing system, the first transaction information to the executing fraud detection system;
retrieving, from the authorization system, based on the transaction request, and via the authorization API, second transaction information;
via the executing fraud detection system:
 accessing the second transaction information;
 receiving from the transaction processing system the first transaction information;
 executing the risk calculation engine and calculating, via the executing calculation engine and utilizing the at least one machine learning model, a risk value for the transaction request based on the first transaction information and the second transaction information;
 generating an authorization request based on the transaction request and transmitting the authorization request to the authorization system over the network utilizing an ISO protocol;
 transmitting, via the authorization API, and utilizing a non-ISO protocol, the risk value to the authorization system;
 receiving, over the network, and from the authorization system, an authorization decision;
 determining whether to approve or deny the transaction request based, at least, on the received authorization decision; and
 transmitting, over the network, a resulting approval or denial determination to the merchant system.

8. The non-transitory computer readable storage medium according to claim 7, wherein the ISO protocol comprises a first data field that corresponds to a merchant identification associated with the transaction request.

9. The non-transitory computer readable storage medium according to claim 7, wherein executing the risk calculation engine and calculating, via the executing calculation engine and utilizing the at least one machine learning model comprises: selecting, by the executing calculation engine, the at least one machine learning model based on the first transaction information.

10. The non-transitory computer readable storage medium according to claim 9, wherein executing the risk calculation engine and calculating, via the executing calculation engine and utilizing the at least one machine learning model further comprises: applying, via the executing calculation engine, the at least one machine learning model to the first transaction information to calculate the risk value.

11. The non-transitory computer readable storage medium according to claim 7,
wherein the second transaction information comprises one or more of an internet protocol (IP) address associated with the transaction request, an email associated with the transaction request, a phone number associated with the transaction request, billing information associated with the transaction request, shipping information associated with the transaction request, or an indication whether a scanned image of a card associated with the transaction request was received.

12. The non-transitory computer readable storage medium according to claim 7, wherein the ISO protocol is an ISO 8583 protocol.

13. A commerce platform system, comprising:
a processor; and
a memory storing executable instructions,
that when executed by the processor, causes the processor to perform operations of:
storing a transaction processing system, a fraud detection system comprising a risk calculation engine, and an authorization API in bidirectional communication over the network with an authorization system, wherein the risk calculation engine comprises at least one machine learning model and the transaction processing system is in communication with a merchant system over a network;
executing the fraud detection system;
receiving, via the transaction processing system, and over the network, a transaction request from the merchant system, wherein the transaction request comprises first transaction information, and sending, via the transaction processing system, the first transaction information to the executing fraud detection system;
retrieving, from the authorization system, based on the transaction request, and via the authorization API, second transaction information;
via the executing fraud detection system:
 accessing the second transaction information;
 receiving from the transaction processing system the first transaction information;
 executing the risk calculation engine and calculating, via the executing calculation engine and utilizing the at least one machine learning model, a risk value for the transaction request based on the first transaction information and the second transaction information;
 generating an authorization request based on the transaction request and transmitting the authorization request to the authorization system over the network utilizing an ISO protocol;

transmitting, via the authorization API, and utilizing a non-ISO protocol, the risk value to the authorization system;

receiving, over the network, and from the authorization system, an authorization decision;

determining whether to approve or deny the transaction request based, at least, on the received authorization decision; and transmitting, over the network, a resulting approval or denial determination to the merchant system.

14. The commerce platform system according to claim 13, wherein the ISO protocol comprises a first data field that corresponds to a merchant identification associated with the transaction request.

15. The commerce platform system according to claim 13, wherein executing the risk calculation engine and calculating, via the executing calculation engine and utilizing the at least one machine learning model comprises: selecting, by the executing calculation engine, the at least one machine learning model based on the first transaction information.

16. The commerce platform system according to claim 15, wherein executing the risk calculation engine and calculating, via the executing calculation engine and utilizing the at least one machine learning model further comprises: applying, via the executing calculation engine, the at least one machine learning model to the first transaction information to calculate the risk value.

17. The commerce platform system according to claim 13, wherein the second transaction information comprises one or more of an internet protocol (IP) address associated with the transaction request, an email associated with the transaction request, a phone number associated with the transaction request, billing information associated with the transaction request, shipping information associated with the transaction request, or an indication whether a scanned image of a card associated with the transaction request was received by the commerce platform system.

18. The commerce platform system according to claim 13, wherein the ISO protocol is an ISO 8583 protocol.

\* \* \* \* \*